(12) United States Patent
Ozawa et al.

(10) Patent No.: US 10,438,623 B2
(45) Date of Patent: *Oct. 8, 2019

(54) MAGNETIC TAPE HAVING CHARACTERIZED MAGNETIC LAYER

(71) Applicant: FUJIFILM Corporation, Tokyo (JP)

(72) Inventors: Eiki Ozawa, Minami-ashigara (JP); Norihito Kasada, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/920,616

(22) Filed: Mar. 14, 2018

(65) Prior Publication Data

US 2018/0286443 A1 Oct. 4, 2018

(30) Foreign Application Priority Data

Mar. 29, 2017 (JP) ................................ 2017-065751

(51) Int. Cl.
| | | |
|---|---|---|
| *G11B 5/71* | (2006.01) | |
| *G11B 5/706* | (2006.01) | |
| *G11B 5/008* | (2006.01) | |
| *G11B 5/70* | (2006.01) | |
| *G11B 5/78* | (2006.01) | |

(52) U.S. Cl.
CPC ...... *G11B 5/70615* (2013.01); *G11B 5/00813* (2013.01); *G11B 5/70* (2013.01); *G11B 5/70626* (2013.01); *G11B 5/71* (2013.01); *G11B 5/78* (2013.01)

(58) Field of Classification Search
None
See application file for complete search history.

(56) References Cited

U.S. PATENT DOCUMENTS

| | | | |
|---|---|---|---|
| 3,966,686 A | 6/1976 | Asakura et al. | |
| 4,112,187 A | 9/1978 | Asakura et al. | |
| 4,425,404 A | 1/1984 | Suzuki et al. | |
| 4,693,930 A | 9/1987 | Kuo et al. | |
| 4,746,569 A | 5/1988 | Takahashi et al. | |
| 4,825,317 A | 4/1989 | Rausch | |
| 5,242,752 A | 9/1993 | Isobe et al. | |
| 5,419,938 A | 5/1995 | Kagotani et al. | |
| 5,445,881 A | 8/1995 | Irie | |
| 5,474,814 A | 12/1995 | Komatsu et al. | |
| 5,496,607 A | 3/1996 | Inaba et al. | |
| 5,540,957 A | 7/1996 | Ueda et al. | |
| 5,585,032 A | 12/1996 | Nakata et al. | |
| 5,645,917 A | 7/1997 | Ejiri et al. | |
| 5,689,384 A | 11/1997 | Albrecht et al. | |
| 5,728,454 A | 3/1998 | Inaba et al. | |
| 5,786,074 A | 6/1998 | Soui | |
| 5,827,600 A | 10/1998 | Kiyomi et al. | |
| 6,099,957 A | 8/2000 | Yamamoto et al. | |
| 6,183,606 B1 | 2/2001 | Kuo et al. | |
| 6,207,252 B1 * | 3/2001 | Shimomura | G11B 5/70 428/141 |
| 6,228,461 B1 | 5/2001 | Sueki et al. | |
| 6,254,964 B1 | 7/2001 | Saito et al. | |
| 6,261,647 B1 | 7/2001 | Komatsu et al. | |
| 6,268,043 B1 | 7/2001 | Koizumi et al. | |
| 6,496,328 B1 | 12/2002 | Dugas | |
| 6,579,826 B2 | 6/2003 | Furuya et al. | |
| 6,649,256 B1 | 11/2003 | Buczek et al. | |
| 6,686,022 B2 | 2/2004 | Takano et al. | |
| 6,770,359 B2 | 8/2004 | Masaki | |
| 6,791,803 B2 | 9/2004 | Saito et al. | |
| 6,835,461 B1 | 12/2004 | Yamagata et al. | |
| 6,893,746 B1 | 5/2005 | Kirino et al. | |
| 6,921,592 B2 | 7/2005 | Tani et al. | |
| 6,939,606 B2 | 9/2005 | Hashimoto et al. | |
| 6,950,269 B1 | 9/2005 | Johnson | |
| 6,994,925 B2 | 2/2006 | Masaki | |
| 7,014,927 B2 | 3/2006 | Sueki et al. | |

(Continued)

FOREIGN PATENT DOCUMENTS

| | | |
|---|---|---|
| DE | 101 46 429 A1 | 3/2002 |
| GB | 2495356 A | 4/2013 |
| JP | 61-11924 A | 1/1986 |
| JP | 61-139923 A | 6/1986 |
| JP | 61-139932 A | 6/1986 |
| JP | 63-129519 A | 6/1988 |
| JP | 63-249932 A | 10/1988 |
| JP | 64-57422 A | 3/1989 |
| JP | 64-60819 A | 3/1989 |
| JP | 5-258283 A | 10/1993 |
| JP | 5-298653 A | 11/1993 |
| JP | 7-57242 A | 3/1995 |
| JP | 11-110743 A | 4/1999 |
| JP | 11-175949 A | 7/1999 |
| JP | 11-273051 A | 10/1999 |
| JP | 2000-251240 A | 9/2000 |
| JP | 2002-157726 A | 5/2002 |
| JP | 2002-329605 A | 11/2002 |
| JP | 2002-367142 A | 12/2002 |

(Continued)

OTHER PUBLICATIONS

Notice of Allowance dated Apr. 16, 2019 in U.S. Appl. No. 15/625,428.

(Continued)

*Primary Examiner* — Kevin M Bernatz

(74) *Attorney, Agent, or Firm* — Sughrue Mion, PLLC

(57) ABSTRACT

A magnetic tape has a total thickness of a non-magnetic layer and a magnetic layer of 0.60 μm or smaller. The magnetic layer includes an abrasive and fatty acid ester. The percentage of a plan view maximum area of the abrasive confirmed in a region having a size of 4.3 μm×6.3 μm of the surface of the magnetic layer with respect to the total area of the region, obtained by plane observation performed by using an SEM is 0.02% or greater and less than 0.06%. The full widths at half maximum of spacing distribution measured by optical interferometry regarding the surface of the magnetic layer before and after performing a vacuum heating with respect to the magnetic tape are greater than 0 nm and 7.0 nm or smaller, and the difference between spacings before and after the vacuum heating is greater than 0 nm and is 8.0 nm or smaller.

11 Claims, 1 Drawing Sheet

(56) References Cited

U.S. PATENT DOCUMENTS

| | | |
|---|---|---|
| 7,029,726 B1 | 4/2006 | Chen et al. |
| 7,153,366 B1 | 12/2006 | Chen et al. |
| 7,255,908 B2 | 8/2007 | Ishikawa et al. |
| 7,511,907 B2 | 3/2009 | Dugas et al. |
| 7,515,383 B2 | 4/2009 | Saito et al. |
| 7,803,471 B1 | 9/2010 | Ota et al. |
| 7,839,599 B2 | 11/2010 | Bui et al. |
| 8,000,057 B2 | 8/2011 | Bui et al. |
| 8,524,108 B2 | 9/2013 | Hattori |
| 8,535,817 B2 * | 9/2013 | Imaoka .................... G11B 5/70 428/844 |
| 8,576,510 B2 | 11/2013 | Cherubini et al. |
| 8,681,451 B2 | 3/2014 | Harasawa et al. |
| 9,105,294 B2 | 8/2015 | Jensen et al. |
| 9,311,946 B2 | 4/2016 | Tanaka et al. |
| 9,495,985 B2 | 11/2016 | Biskeborn et al. |
| 9,530,444 B2 * | 12/2016 | Kasada ................ G11B 5/7085 |
| 9,542,967 B2 | 1/2017 | Sekiguchi et al. |
| 9,564,161 B1 | 2/2017 | Cherubini et al. |
| 9,601,146 B2 | 3/2017 | Kasada et al. |
| 9,704,425 B2 | 7/2017 | Zhang et al. |
| 9,704,525 B2 | 7/2017 | Kasada |
| 9,704,527 B2 | 7/2017 | Kasada |
| 9,711,174 B2 | 7/2017 | Kasada et al. |
| 9,721,605 B2 | 8/2017 | Oyanagi et al. |
| 9,721,606 B2 | 8/2017 | Kasada |
| 9,721,607 B2 | 8/2017 | Tada et al. |
| 9,748,026 B2 | 8/2017 | Shirata |
| 9,773,519 B2 | 9/2017 | Kasada et al. |
| 9,779,772 B1 | 10/2017 | Kasada et al. |
| 9,837,104 B1 | 12/2017 | Biskeborn |
| 9,837,116 B2 * | 12/2017 | Ozawa ............... G11B 5/00813 |
| 9,959,894 B2 | 5/2018 | Omura |
| 9,972,351 B1 | 5/2018 | Kaneko et al. |
| 9,978,414 B1 | 5/2018 | Kaneko et al. |
| 9,984,710 B2 | 5/2018 | Kasada |
| 9,984,712 B1 | 5/2018 | Ozawa |
| 9,984,716 B1 | 5/2018 | Kaneko et al. |
| 10,008,230 B1 * | 6/2018 | Ozawa ..................... G11B 5/71 |
| 10,026,430 B2 | 7/2018 | Kasada et al. |
| 10,026,433 B2 | 7/2018 | Kasada et al. |
| 10,026,434 B2 | 7/2018 | Oyanagi et al. |
| 10,026,435 B2 | 7/2018 | Kasada et al. |
| 10,062,403 B1 | 8/2018 | Kasada et al. |
| 10,074,393 B2 | 9/2018 | Kaneko et al. |
| 10,134,433 B2 | 11/2018 | Kasada et al. |
| 10,170,144 B2 | 1/2019 | Ozawa et al. |
| 2001/0038928 A1 | 11/2001 | Nakamigawa et al. |
| 2001/0053458 A1 | 12/2001 | Suzuki et al. |
| 2002/0072472 A1 | 7/2002 | Furuya et al. |
| 2002/0122339 A1 | 9/2002 | Takano et al. |
| 2003/0059649 A1 | 3/2003 | Saliba et al. |
| 2003/0091866 A1 | 5/2003 | Ejiri et al. |
| 2003/0124386 A1 | 7/2003 | Masaki |
| 2003/0170498 A1 | 9/2003 | Inoue |
| 2003/0228493 A1 | 12/2003 | Doushita et al. |
| 2004/0018388 A1 | 1/2004 | Kitamura et al. |
| 2004/0053074 A1 | 3/2004 | Jingu et al. |
| 2004/0197605 A1 | 10/2004 | Seki et al. |
| 2004/0213948 A1 | 10/2004 | Saito et al. |
| 2004/0218304 A1 | 11/2004 | Goker et al. |
| 2004/0265643 A1 | 12/2004 | Ejiri |
| 2005/0057838 A1 | 3/2005 | Ohtsu |
| 2005/0153170 A1 | 7/2005 | Inoue et al. |
| 2005/0196645 A1 | 9/2005 | Doi et al. |
| 2005/0260456 A1 | 11/2005 | Hanai et al. |
| 2005/0260459 A1 | 11/2005 | Hanai et al. |
| 2005/0264935 A1 | 12/2005 | Sueki et al. |
| 2006/0008681 A1 | 1/2006 | Hashimoto et al. |
| 2006/0035114 A1 | 2/2006 | Kuse et al. |
| 2006/0056095 A1 | 3/2006 | Saitou |
| 2006/0068232 A1 | 3/2006 | Mikamo et al. |
| 2006/0187589 A1 | 8/2006 | Harasawa et al. |
| 2006/0232883 A1 | 10/2006 | Biskeborn et al. |
| 2007/0009769 A1 | 1/2007 | Kanazawa |
| 2007/0020489 A1 | 1/2007 | Yamazaki et al. |
| 2007/0020490 A1 | 1/2007 | Harasawa et al. |
| 2007/0224456 A1 | 9/2007 | Murao et al. |
| 2007/0230054 A1 | 10/2007 | Takeda et al. |
| 2007/0231606 A1 | 10/2007 | Hanai |
| 2008/0057351 A1 | 3/2008 | Meguro et al. |
| 2008/0144211 A1 | 6/2008 | Weber et al. |
| 2008/0152956 A1 | 6/2008 | Murayama et al. |
| 2008/0174897 A1 | 7/2008 | Bates et al. |
| 2008/0297950 A1 | 12/2008 | Noguchi et al. |
| 2008/0311308 A1 | 12/2008 | Lee et al. |
| 2009/0027812 A1 | 1/2009 | Noguchi et al. |
| 2009/0087689 A1 | 4/2009 | Doushita et al. |
| 2009/0161249 A1 | 6/2009 | Takayama et al. |
| 2009/0162701 A1 | 6/2009 | Jensen et al. |
| 2010/0000966 A1 | 1/2010 | Kamata et al. |
| 2010/0035086 A1 | 2/2010 | Inoue et al. |
| 2010/0035088 A1 | 2/2010 | Inoue |
| 2010/0053810 A1 | 3/2010 | Biskeborn et al. |
| 2010/0073816 A1 | 3/2010 | Komori et al. |
| 2010/0081011 A1 | 4/2010 | Nakamura |
| 2010/0134929 A1 | 6/2010 | Ito |
| 2010/0227201 A1 | 9/2010 | Sasaki et al. |
| 2010/0246073 A1 | 9/2010 | Katayama |
| 2011/0003241 A1 | 1/2011 | Kaneko et al. |
| 2011/0051280 A1 | 3/2011 | Karp et al. |
| 2011/0052908 A1 | 3/2011 | Imaoka |
| 2011/0077902 A1 | 3/2011 | Awezec et al. |
| 2011/0151281 A1 | 6/2011 | Inoue |
| 2011/0244272 A1 | 10/2011 | Suzuki et al. |
| 2012/0045664 A1 | 2/2012 | Tanaka et al. |
| 2012/0177951 A1 | 7/2012 | Yamazaki et al. |
| 2012/0183811 A1 | 7/2012 | Hattori et al. |
| 2012/0196156 A1 | 8/2012 | Suzuki |
| 2012/0243120 A1 | 9/2012 | Harasawa et al. |
| 2012/0244387 A1 | 9/2012 | Mori et al. |
| 2012/0251845 A1 | 10/2012 | Wang et al. |
| 2013/0029183 A1 | 1/2013 | Omura et al. |
| 2013/0084470 A1 | 4/2013 | Hattori et al. |
| 2013/0088794 A1 | 4/2013 | Cherubini et al. |
| 2013/0256584 A1 | 10/2013 | Yamazaki et al. |
| 2013/0260179 A1 | 10/2013 | Kasada et al. |
| 2013/0279040 A1 | 10/2013 | Cideciyan et al. |
| 2013/0286510 A1 | 10/2013 | Rothermel et al. |
| 2014/0011055 A1 | 1/2014 | Suzuki et al. |
| 2014/0130067 A1 | 5/2014 | Madison et al. |
| 2014/0139944 A1 | 5/2014 | Johnson et al. |
| 2014/0272474 A1 * | 9/2014 | Kasada ................ G11B 5/7085 428/842.8 |
| 2014/0295214 A1 | 10/2014 | Tada et al. |
| 2014/0342189 A1 | 11/2014 | Tachibana et al. |
| 2014/0366990 A1 | 12/2014 | Lai et al. |
| 2015/0043101 A1 | 2/2015 | Biskeborn et al. |
| 2015/0098149 A1 | 4/2015 | Bates et al. |
| 2015/0111066 A1 | 4/2015 | Terakawa et al. |
| 2015/0123026 A1 | 5/2015 | Masada et al. |
| 2015/0302879 A1 | 10/2015 | Holmberg et al. |
| 2015/0380036 A1 | 12/2015 | Kasada et al. |
| 2016/0061447 A1 | 3/2016 | Kobayashi |
| 2016/0064025 A1 | 3/2016 | Kurokawa et al. |
| 2016/0092315 A1 | 3/2016 | Ashida et al. |
| 2016/0093321 A1 | 3/2016 | Aoshima et al. |
| 2016/0093322 A1 | 3/2016 | Kasada et al. |
| 2016/0093323 A1 | 3/2016 | Omura |
| 2016/0180875 A1 | 6/2016 | Tanaka et al. |
| 2016/0189739 A1 | 6/2016 | Kasada et al. |
| 2016/0189740 A1 | 6/2016 | Oyanagi et al. |
| 2016/0247530 A1 | 8/2016 | Kasada |
| 2016/0260449 A1 | 9/2016 | Ahmad et al. |
| 2016/0276076 A1 | 9/2016 | Kasada |
| 2017/0032812 A1 | 2/2017 | Kasada |
| 2017/0053669 A1 | 2/2017 | Kasada |
| 2017/0053670 A1 | 2/2017 | Oyanagi et al. |
| 2017/0053671 A1 | 2/2017 | Kasada et al. |
| 2017/0058227 A1 | 3/2017 | Kondo et al. |
| 2017/0092315 A1 * | 3/2017 | Ozawa ..................... G11B 5/70 |
| 2017/0130156 A1 | 5/2017 | Kondo et al. |
| 2017/0178675 A1 | 6/2017 | Kasada |
| 2017/0178676 A1 | 6/2017 | Kasada |

(56) References Cited

U.S. PATENT DOCUMENTS

| | | | |
|---|---|---|---|
| 2017/0178677 A1 | 6/2017 | Kasada | |
| 2017/0186456 A1 | 6/2017 | Tada et al. | |
| 2017/0186460 A1 | 6/2017 | Kasada et al. | |
| 2017/0221513 A1 | 8/2017 | Hiroi et al. | |
| 2017/0221516 A1 | 8/2017 | Oyanagi et al. | |
| 2017/0221517 A1* | 8/2017 | Ozawa | G11B 5/70 |
| 2017/0249963 A1 | 8/2017 | Oyanagi et al. | |
| 2017/0249964 A1 | 8/2017 | Kasada et al. | |
| 2017/0249965 A1 | 8/2017 | Kurokawa et al. | |
| 2017/0249966 A1 | 8/2017 | Tachibana et al. | |
| 2017/0287517 A1 | 10/2017 | Hosoya et al. | |
| 2017/0355022 A1 | 12/2017 | Kaneko et al. | |
| 2017/0358318 A1 | 12/2017 | Kasada et al. | |
| 2017/0372726 A1 | 12/2017 | Kasada et al. | |
| 2017/0372727 A1 | 12/2017 | Kasada et al. | |
| 2017/0372736 A1 | 12/2017 | Kaneko et al. | |
| 2017/0372737 A1 | 12/2017 | Oyanagi et al. | |
| 2017/0372738 A1 | 12/2017 | Kasada | |
| 2017/0372739 A1* | 12/2017 | Ozawa | G11B 5/71 |
| 2017/0372740 A1 | 12/2017 | Ozawa et al. | |
| 2017/0372741 A1 | 12/2017 | Kurokawa et al. | |
| 2017/0372742 A1 | 12/2017 | Kaneko et al. | |
| 2017/0372743 A1 | 12/2017 | Kasada et al. | |
| 2017/0372744 A1 | 12/2017 | Ozawa et al. | |
| 2018/0061446 A1* | 3/2018 | Kasada | G11B 5/00817 |
| 2018/0061447 A1 | 3/2018 | Kasada | |
| 2018/0082710 A1 | 3/2018 | Tada et al. | |
| 2018/0137887 A1 | 5/2018 | Sekiguchi et al. | |
| 2018/0182417 A1 | 6/2018 | Kaneko et al. | |
| 2018/0182422 A1 | 6/2018 | Kawakami et al. | |
| 2018/0182425 A1 | 6/2018 | Kasada et al. | |
| 2018/0182426 A1 | 6/2018 | Ozawa et al. | |
| 2018/0182427 A1 | 6/2018 | Kasada et al. | |
| 2018/0182428 A1 | 6/2018 | Kasada et al. | |
| 2018/0182429 A1 | 6/2018 | Kasada et al. | |
| 2018/0182430 A1* | 6/2018 | Ozawa | G11B 5/78 |
| 2018/0240475 A1 | 8/2018 | Kasada | |
| 2018/0240476 A1 | 8/2018 | Kasada et al. | |
| 2018/0240478 A1 | 8/2018 | Kasada et al. | |
| 2018/0240479 A1 | 8/2018 | Kasada et al. | |
| 2018/0240481 A1 | 8/2018 | Kasada et al. | |
| 2018/0240488 A1 | 8/2018 | Kasada | |
| 2018/0240489 A1 | 8/2018 | Kasada et al. | |
| 2018/0240490 A1 | 8/2018 | Kurokawa et al. | |
| 2018/0240491 A1* | 8/2018 | Ozawa | G11B 5/00813 |
| 2018/0240492 A1 | 8/2018 | Kasada | |
| 2018/0240493 A1 | 8/2018 | Tada et al. | |
| 2018/0240494 A1 | 8/2018 | Kurokawa et al. | |
| 2018/0240495 A1* | 8/2018 | Kasada | G11B 5/712 |
| 2018/0286439 A1* | 10/2018 | Ozawa | G11B 5/3909 |
| 2018/0286442 A1* | 10/2018 | Ozawa | G11B 5/70615 |
| 2018/0286444 A1 | 10/2018 | Kasada et al. | |
| 2018/0286446 A1* | 10/2018 | Ozawa | G11B 5/712 |
| 2018/0286447 A1 | 10/2018 | Ozawa et al. | |
| 2018/0286448 A1* | 10/2018 | Ozawa | G11B 5/714 |
| 2018/0286449 A1 | 10/2018 | Kasada et al. | |
| 2018/0286450 A1 | 10/2018 | Kasada et al. | |
| 2018/0286451 A1* | 10/2018 | Ozawa | G11B 5/70 |
| 2018/0286452 A1* | 10/2018 | Ozawa | G11B 5/70 |
| 2018/0286453 A1 | 10/2018 | Kasada et al. | |
| 2018/0301165 A1 | 10/2018 | Oyanagi et al. | |
| 2018/0350398 A1 | 12/2018 | Kawakami et al. | |
| 2018/0350400 A1 | 12/2018 | Kaneko et al. | |
| 2018/0358042 A1 | 12/2018 | Kasada et al. | |
| 2018/0374507 A1 | 12/2018 | Kasada | |
| 2019/0027167 A1 | 1/2019 | Tada et al. | |
| 2019/0027168 A1 | 1/2019 | Kasada et al. | |
| 2019/0027171 A1 | 1/2019 | Kasada | |
| 2019/0027172 A1 | 1/2019 | Kasada | |
| 2019/0027174 A1 | 1/2019 | Tada et al. | |
| 2019/0027175 A1 | 1/2019 | Kurokawa et al. | |
| 2019/0027176 A1 | 1/2019 | Kurokawa et al. | |
| 2019/0027177 A1 | 1/2019 | Kasada | |
| 2019/0027178 A1 | 1/2019 | Kasada | |
| 2019/0027179 A1* | 1/2019 | Ozawa | G11B 5/735 |
| 2019/0027180 A1 | 1/2019 | Kasada et al. | |
| 2019/0027181 A1 | 1/2019 | Ozawa et al. | |
| 2019/0035424 A1 | 1/2019 | Endo | |
| 2019/0051325 A1 | 2/2019 | Kasada et al. | |
| 2019/0088278 A1 | 3/2019 | Kasada et al. | |
| 2019/0096437 A1* | 3/2019 | Ozawa | G11B 5/70 |
| 2019/0103130 A1 | 4/2019 | Kasada et al. | |
| 2019/0103131 A1 | 4/2019 | Kasada et al. | |
| 2019/0103133 A1 | 4/2019 | Ozawa et al. | |
| 2019/0103134 A1 | 4/2019 | Kasada et al. | |
| 2019/0103135 A1 | 4/2019 | Ozawa et al. | |
| 2019/0130936 A1 | 5/2019 | Kaneko et al. | |

FOREIGN PATENT DOCUMENTS

| | | |
|---|---|---|
| JP | 2002-367318 A | 12/2002 |
| JP | 2003-77116 A | 3/2003 |
| JP | 2003-323710 A | 11/2003 |
| JP | 2004-005820 A | 1/2004 |
| JP | 2004-133997 A | 4/2004 |
| JP | 2004-185676 A | 7/2004 |
| JP | 2005-38579 A | 2/2005 |
| JP | 2005-243063 A | 9/2005 |
| JP | 2005-243162 A | 9/2005 |
| JP | 2006-92672 A | 4/2006 |
| JP | 2006-286114 A | 10/2006 |
| JP | 2007-273039 A | 10/2007 |
| JP | 2007-287310 A | 11/2007 |
| JP | 2007-297427 A | 11/2007 |
| JP | 2008-243317 A | 10/2008 |
| JP | 2009-283082 A | 12/2009 |
| JP | 2010-036350 A | 2/2010 |
| JP | 2010-49731 A | 3/2010 |
| JP | 2011-48878 A | 3/2011 |
| JP | 2011-138566 A | 7/2011 |
| JP | 2011-210288 A | 10/2011 |
| JP | 2011-225417 A | 11/2011 |
| JP | 2012-38367 A | 2/2012 |
| JP | 2012-43495 A | 3/2012 |
| JP | 2012-203955 A | 10/2012 |
| JP | 2013-25853 A | 2/2013 |
| JP | 2013-77360 A | 4/2013 |
| JP | 2013-164889 A | 8/2013 |
| JP | 2014-15453 A | 1/2014 |
| JP | 2014-179149 A | 9/2014 |
| JP | 2015-39801 A | 3/2015 |
| JP | 2015-111484 A | 6/2015 |
| JP | 2016-15183 A | 1/2016 |
| JP | 2016-502224 A | 1/2016 |
| JP | 2016-51493 A | 4/2016 |
| JP | 2016-71926 A | 5/2016 |
| JP | 2016-139451 A | 8/2016 |

OTHER PUBLICATIONS

Notice of Allowance dated Apr. 30, 2019 in U.S. Appl. No. 15/380,309.
Notice of Allowance dated Mar. 13, 2019 in U.S. Appl. No. 16/100,289.
Notice of Allowance dated Mar. 18, 2019 in U.S. Appl. No. 15/626,355.
Notice of Allowance dated Mar. 18, 2019 in U.S. Appl. No. 15/628,814.
Office Action dated Apr. 15, 2019 in U.S. Appl. No. 16/182,083.
Office Action dated Apr. 16, 2019 in U.S. Appl. No. 16/232,165.
Office Action dated Apr. 23, 2019 in Japanese Application No. 2016-169851.
Office Action dated Apr. 23, 2019 in Japanese Application No. 2016-182230.
Office Action dated Feb. 5, 2019 in U.S. Appl. No. 16/038,339.
Office Action dated Mar. 15, 2019 in U.S. Appl. No. 15/280,195.
Office Action dated Mar. 15, 2019 in U.S. Appl. No. 15/619,012.
Office Action dated Mar. 15, 2019 in U.S. Appl. No. 15/627,696.
Office Action dated Mar. 15, 2019 in U.S. Appl. No. 15/690,906.
Office Action dated Mar. 18, 2019 in U.S. Appl. No. 15/442,961.
Office Action dated Mar. 19, 2019 in Japanese Application No. 2016-116261.

(56) References Cited

OTHER PUBLICATIONS

Office Action dated Mar. 19, 2019 in Japanese Application No. 2016-124515.
Office Action dated Mar. 19, 2019 in Japanese Application No. 2016-124529.
Office Action dated Mar. 19, 2019 in Japanese Application No. 2016-124932.
Office Action dated Mar. 19, 2019 in Japanese Application No. 2016-124933.
Office Action dated Mar. 19, 2019 in Japanese Application No. 2016-124935.
Office Action dated Mar. 19, 2019 in U.S. Appl. No. 15/443,094.
Office Action dated Mar. 21, 2019 in U.S. Appl. No. 15/900,144.
Office Action dated Mar. 21, 2019 in U.S. Appl. No. 16/160,377.
Office Action dated Mar. 27, 2019 in U.S. Appl. No. 15/690,400.
Office Action dated Mar. 7, 2019 in U.S. Appl. No. 15/854,439.
Notice of Allowance dated May 13, 2019 in U.S. Appl. No. 15/900,379.
Notice of Allowance dated May 14, 2019 in U.S. Appl. No. 15/422,821.
Notice of Allowance dated May 14, 2019 in U.S. Appl. No. 15/900,164.
Notice of Allowance dated May 15, 2019 in U.S. Appl. No. 15/900,106.
Notice of Allowance dated May 15, 2019 in U.S. Appl. No. 15/900,242.
Notice of Allowance dated May 16, 2019 in U.S. Appl. No. 15/614,876.
Notice of Allowance dated May 16, 2019 in U.S. Appl. No. 15/621,464.
Office Action dated Apr. 4, 2019 in U.S. Appl. No. 16/184,312.
Office Action dated Sep. 19, 2014, which issued during the prosecution of U.S. Appl. No. 14/209,065.
Office Action dated Jan. 27, 2015 from the Japanese Patent Office in Japanese Application No. 2013-053543.
"Introduction to TMR Magnetic Sensors", Anonymous, Mar. 12, 2015, MR Sensor Technology, pp. 1-5 (Year: 2015).
Office Action dated Mar. 13, 2015, which issued during the prosecution of U.S. Appl. No. 14/209,065.
Office Action dated Jul. 6, 2015, which issued during the prosecution of U.S. Appl. No. 14/209,065.
Office Action dated Sep. 10, 2015, which issued during the prosecution of U.S. Appl. No. 14/209,065.
An Office Action dated Feb. 4, 2016 which issued during the prosecution of U.S. Appl. No. 14/753,227.
Office Action dated Feb. 25, 2016, which issued during the prosecution of U.S. Appl. No. 14/867,752.
Office Action dated Mar. 24, 2016, which issued during the prosecution of U.S. Appl. No. 14/209,065.
Final Office Action dated Aug. 15, 2016 which issued during the prosecution of U.S. Appl. No. 14/753,227.
Notice of Allowance dated Oct. 6, 2016, which issued during the prosecution of U.S. Appl. No. 14/209,065.
Office Action dated Oct. 19, 2016, which issued during the prosecution of U.S. Appl. No. 14/867,752.
Office Action dated Nov. 8, 2016 from the Japanese Patent Office in Japanese Application No. 2014-199022.
Office Action dated Nov. 16, 2016 which issued during the prosecution of U.S. Appl. No. 15/072,550.
Office Action dated Nov. 18, 2016 which issued during the prosecution of U.S. Appl. No. 14/753,227.
Notice of Allowance dated Dec. 2, 2016 which issued during the prosecution of U.S. Appl. No. 14/753,227.
Office Action dated Dec. 5, 2016 from the United States Patent and Trademark Office in U.S. Appl. No. 14/978,834.
Office Action dated Dec. 6, 2016 from the United States Patent and Trademark Office in U.S. Appl. No. 14/757,555.
Office Action dated Mar. 16, 2017, which issued during the prosecution of U.S. Appl. No. 14/867,752.
Notice of Allowance dated Apr. 25, 2017 which issued during the prosecution of U.S. Appl. No. 15/072,550.
Office Action dated Apr. 26, 2017 which issued during the prosecution of U.S. Appl. No. 15/388,864.
Notice of Allowance dated Apr. 27, 2017, which issued during the prosecution of U.S. Appl. No. 15/052,115.
Notice of Allowance dated May 8, 2017, which issued during the prosecution of U.S. Appl. No. 14/757,555.
Notice of Allowance dated May 8, 2017, which issued during the prosecution of U.S. Appl. No. 14/978,834.
Notice of Allowance dated Jun. 2, 2017, which issued during the prosecution of U.S. Appl. No. 15/218,190.
Office Action dated Jun. 9, 2017 which issued during the prosecution of U.S. Appl. No. 15/388,864.
Notice of Allowance dated Jun. 28, 2017, which issued during the prosecution of U.S. Appl. No. 15/464,991.
Notice of Allowance dated Jul. 12, 2017 which issued during the prosecution of U.S. Appl. No. 15/388,864.
Office Action dated Aug. 10, 2017, which issued during the prosecution of U.S. Appl. No. 14/870,618.
Notice of Allowance dated Aug. 30, 2017, which issued during the prosecution of U.S. Appl. No. 15/466,143.
Office Action dated Sep. 7, 2017, which issued during the prosecution of U.S. Appl. No. 14/867,752.
Office Action dated Sep. 26, 2017 issued by the Japanese Patent Office in JP Appln. No. 2014-265723.
Office Action dated Sep. 26, 2017 issued by the Japanese Patent Office in JP Appln. No. 2015-249264.
Office Action dated Oct. 5, 2017, which issued during the prosecution of U.S. Appl. No. 15/241,286.
Office Action dated Oct. 5, 2017, which issued during the prosecution of U.S. Appl. No. 15/241,297.
Office Action dated Oct. 5, 2017, which issued during the prosecution of U.S. Appl. No. 15/241,631.
Office Action dated Oct. 5, 2017, which issued during the prosecution of U.S. Appl. No. 15/378,907.
Office Action dated Jan. 31, 2018, which issued during the prosecution of U.S. Appl. No. 14/867,752.
Notice of Allowance dated Feb. 14, 2018, which issued during the prosecution of U.S. Appl. No. 14/870,618.
Notice of Allowance dated Mar. 14, 2018, which issued during the prosecution of U.S. Appl. No. 15/854,474.
Notice of Allowance dated Mar. 16, 2018 which issued during the prosecution of U.S. Appl. No. 15/854,410.
Notice of Allowance dated Mar. 19, 2018, which issued during the prosecution of U.S. Appl. No. 15/378,907.
Notice of Allowance dated Mar. 21, 2018, which issued during the prosecution of U.S. Appl. No. 15/241,286.
Notice of Allowance dated Mar. 21, 2018, which issued during the prosecution of U.S. Appl. No. 15/241,297.
Notice of Allowance dated Mar. 27, 2018, which issued during the prosecution of U.S. Appl. No. 15/241,631.
Notice of Allowance dated Apr. 5, 2018, which issued during the prosecution of U.S. Appl. No. 14/867,752.
Office Action dated Apr. 19, 2018, which issued during the prosecution of U.S. Appl. No. 15/854,438.
Office Action dated May 2, 2018, which issued during the prosecution of U.S. Appl. No. 15/280,195.
Office Action dated May 4, 2018, which issued during the prosecution of U.S. Appl. No. 15/422,944.
Office Action dated May 4, 2018, which issued during the prosecution of U.S. Appl. No. 15/625,428.
Office Action dated May 4, 2018 which issued during the prosecution of U.S. Appl. No. 15/422,821.
Office Action dated May 7, 2018, which issued during the prosecution of U.S. Appl. No. 15/624,792.
Office Action dated May 7, 2018, which issued during the prosecution of U.S. Appl. No. 15/624,897.
Office Action dated May 7, 2018, which issued during the prosecution of U.S. Appl. No. 15/626,832.
Notice of Allowance dated May 10, 2018 which issued during the prosecution of U.S. Appl. No. 15/615,871.

(56) References Cited

OTHER PUBLICATIONS

Office Action dated May 30, 2018 which issued during the prosecution of U.S. Appl. No. 15/388,911.
Office Action dated Jun. 7, 2018 which issued during the prosecution of U.S. Appl. No. 15/380,309.
Office Action dated Jul. 3, 2018, which issued during the prosecution of U.S. Appl. No. 15/920,518.
Office Action dated Jul. 6, 2018 from the United States Patent and Trademark Office in U.S. Appl. No. 15/848,173.
Notice of Allowance dated Jul. 13, 2018, which issued during the prosecution of U.S. Appl. No. 15/920,782.
Office Action dated Aug. 3, 2018 which issued during the prosecution of U.S. Appl. No. 15/388,911.
Office Action dated Aug. 3, 2018 from the United States Patent and Trademark Office in U.S. Appl. No. 15/380,336.
Notice of Allowance dated Aug. 6, 2018, which issued during the prosecution of U.S. Appl. No. 15/920,768.
Notice of Allowance dated Aug. 9, 2018, which issued during the prosecution of U.S. Appl. No. 15/920,563.
Office Action dated Aug. 23, 2018 from the United States Patent and Trademark Office in U.S. Appl. No. 15/614,876.
Office Action dated Aug. 23, 2018 from the United States Patent and Trademark Office in U.S. Appl. No. 15/621,464.
Office Action dated Aug. 23, 2018 from the United States Patent and Trademark Office in U.S. Appl. No. 15/626,720.
Office Action dated Aug. 24, 2018 from the United States Patent and Trademark Office in U.S. Appl. No. 15/620,916.
Notice of Allowance dated Aug. 27, 2018 in U.S. Appl. No. 15/920,635.
Notice of Allowance dated Aug. 28, 2018 from the US Patent & Trademark Office in U.S. Appl. No. 15/422,821.
Notice of Allowance dated Sep. 4, 2018, which issued during the prosecution of U.S. Appl. No. 15/625,428.
Office Action dated Sep. 24, 2018, which issued during the prosecution of U.S. Appl. No. 15/690,400.
Notice of Allowance dated Sep. 24, 2018, which issued during the prosecution of U.S. Appl. No. 15/854,438.
Office Action dated Sep. 27, 2018, which issued during the prosecution of U.S. Appl. No. 15/690,906.
Office Action dated Sep. 27, 2018, which issued during the prosecution of U.S. Appl. No. 15/854,383.
Office Action dated Sep. 28, 2018, which issued during the prosecution of U.S. Appl. No. 15/854,409.
Office Action dated Oct. 3, 2018 from the United States Patent and Trademark Office in U.S. Appl. No. 15/280,195.
Office Action dated Oct. 9, 2018, which issued during the prosecution of U.S. Appl. No. 15/628,814.
Notice of Allowance dated Oct. 11, 2018, which issued during the prosecution of U.S. Appl. No. 15/380,336.
Notice of Allowance dated Oct. 11, 2018, which issued during the prosecution of U.S. Appl. No. 15/422,944.
Notice of Allowance dated Oct. 11, 2018, which issued during the prosecution of U.S. Appl. No. 15/624,792.
Notice of Allowance dated Oct. 11, 2018, which issued during the prosecution of U.S. Appl. No. 15/624,897.
Office Action dated Oct. 12, 2018, which issued during the prosecution of U.S. Appl. No. 15/626,355.
Office Action dated Oct. 12, 2018, which issued during the prosecution of U.S. Appl. No. 15/627,696.
Notice of Allowance dated Oct. 12, 2018, which issued during the prosecution of U.S. Appl. No. 15/626,832.
Office Action dated Oct. 15, 2018, which issued during the prosecution of U.S. Appl. No. 15/619,012.
Office Action dated Oct. 15, 2018, which issued during the prosecution of U.S. Appl. No. 15/854,403.
Office Action dated Oct. 22, 2018, which issued during the prosecution of U.S. Appl. No. 15/854,439.
Office Action dated Nov. 14, 2018 in U.S. Appl. No. 16/100,289.
Office Action dated Nov. 19, 2018 in U.S. Appl. No. 15/900,141.
Office Action dated Nov. 28, 2018, which issued during the prosecution of U.S. Appl. No. 15/899,587.
Office Action dated Nov. 28, 2018, which issued during the prosecution of U.S. Appl. No. 15/900,080.
Office Action dated Nov. 28, 2018, which issued during the prosecution of U.S. Appl. No. 15/900,144.
Office Action dated Nov. 29, 2018, which issued during the prosecution of U.S. Appl. No. 15/380,309.
Office Action dated Nov. 29, 2018, which issued during the prosecution of U.S. Appl. No. 15/422,821.
Notice of Allowance dated Dec. 3, 2018, which issued during the prosecution of U.S. Appl. No. 15/920,518.
Notice of Allowance dated Dec. 4, 2018, which issued during the prosecution of U.S. Appl. No. 15/625,428.
Office Action dated Dec. 7, 2018 in U.S. Appl. No. 15/920,592.
Office Action dated Dec. 14, 2018, which issued during the prosecution of U.S. Appl. No. 15/920,517.
Office Action dated Dec. 17, 2018, which issued during the prosecution of U.S. Appl. No. 15/920,515.
Office Action dated Dec. 17, 2018, which issued during the prosecution of U.S. Appl. No. 15/920,533.
Office Action dated Dec. 17, 2018, which issued during the prosecution of U.S. Appl. No. 15/920,538.
Office Action dated Dec. 17, 2018, which issued during the prosecution of U.S. Appl. No. 15/920,544.
Office Action dated Dec. 19, 2018 in U.S. Appl. No. 15/900,345.
Office Action dated Dec. 19, 2018 in U.S. Appl. No. 15/900,379.
Office Action dated Dec. 20, 2018, which issued during the prosecution of U.S. Appl. No. 15/900,164.
Office Action dated Dec. 20, 2018 in U.S. Appl. No. 15/900,106.
Office Action dated Dec. 20, 2018 in U.S. Appl. No. 15/900,242.
Office Action dated Dec. 21, 2018, which issued during the prosecution of U.S. Appl. No. 15/900,230.
Office Action dated Dec. 21, 2018 in U.S. Appl. No. 15/900,160.
Office Action dated Dec. 25, 2018 in Japanese Application No. 2015-245144.
Office Action dated Dec. 25, 2018 in Japanese Application No. 2015-245145.
Office Action dated Dec. 25, 2018 in Japanese Application No. 2015-254192.
Office Action dated Dec. 27, 2018 in U.S. Appl. No. 15/900,334.
Office Action dated Dec. 31, 2018 in U.S. Appl. No. 16/009,603.
Notice of Allowance dated Jan. 10, 2019 in U.S. Appl. No. 15/848,173.
Office Action dated Jan. 10, 2019 in U.S. Appl. No. 15/899,430.
Notice of Allowance dated Jan. 17, 2019 in U.S. Appl. No. 15/422,944.
Notice of Allowance dated Jan. 17, 2019 in U.S. Appl. No. 15/626,720.
Office Action dated Jan. 29, 2019 in U.S. Appl. No. 15/614,876.
Notice of Allowance dated Jan. 30, 2019 in U.S. Appl. No. 15/854,409.
Office Action dated Jan. 30, 2019 in U.S. Appl. No. 15/620,916.
Office Action dated Feb. 5, 2019 in Japanese Application No. 2016-117339.
Office Action dated Feb. 5, 2019 in Japanese Application No. 2016-123205.
Office Action dated Feb. 5, 2019 in Japanese Application No. 2016-169871.
Office Action dated Feb. 7, 2019 in U.S. Appl. No. 15/621,464.
Office Action dated Feb. 21, 2019 in U.S. Appl. No. 15/854,383.
Office Action dated Feb. 26, 2019 in Japanese Application No. 2016-123207.
Office Action dated Feb. 26, 2019 in U.S. Appl. No. 15/380,336.
Office Action dated Feb. 26, 2019 in U.S. Appl. No. 15/624,792.
Office Action dated Feb. 26, 2019 in U.S. Appl. No. 15/624,897.
Office Action dated Feb. 26, 2019 in U.S. Appl. No. 15/626,832.
Office Action dated Feb. 28, 2019 in U.S. Appl. No. 15/920,518.
Office Action dated Mar. 5, 2019 in U.S. Appl. No. 15/443,026.
Notice of Allowance dated Mar. 5, 2019 in U.S. Appl. No. 16/009,603.
Office Action dated Mar. 6, 2019 in U.S. Appl. No. 15/854,403.
U.S. Appl. No. 15/422,821, Pending.
U.S. Appl. No. 15/624,897, Allowed; RCE filed Nov. 21, 2018.
U.S. Appl. No. 15/624,792, Allowed; RCE filed Nov. 21, 2018.
U.S. Appl. No. 15/626,832, Allowed; RCE filed Nov. 21, 2018.
U.S. Appl. No. 15/625,428, Allowed Dec. 4, 2018; RCE Filed.
U.S. Appl. No. 15/380,336, Allowed; RCE filed Nov. 21, 2018.

(56) References Cited

OTHER PUBLICATIONS

U.S. Appl. No. 15/614,876, Pending.
U.S. Appl. No. 15/621,464, Pending.
U.S. Appl. No. 15/628,814, Pending.
U.S. Appl. No. 15/626,355, Pending.
U.S. Appl. No. 15/380,309, Pending.
U.S. Appl. No. 15/900,164, Pending.
U.S. Appl. No. 15/899,430, Pending.
U.S. Appl. No. 15/920,515, Pending.
U.S. Appl. No. 15/920,517, Pending.
U.S. Appl. No. 15/920,538, Pending.
U.S. Appl. No. 15/920,544, Pending.
U.S. Appl. No. 16/182,083, Pending (Not yet published; continuation of U.S. Appl. No. 15/920,768).
U.S. Appl. No. 16/100,289, Pending.
U.S. Appl. No. 15/900,106, Pending.
U.S. Appl. No. 15/900,379, Pending.
U.S. Appl. No. 15/900,242, Pending.
U.S. Appl. No. 15/052,115, Patented as U.S. Pat. No. 9,704,527.
U.S. Appl. No. 15/218,190, Patented as U.S. Pat. No. 9,721,606.
U.S. Appl. No. 15/280,195, Pending.
U.S. Appl. No. 15/422,821, Allowed.
U.S. Appl. No. 15/422,944, Allowed.
U.S. Appl. No. 15/466,143, Patented as U.S. Pat. No. 9,837,116.
U.S. Appl. No. 15/619,012, Pending.
U.S. Appl. No. 15/624,897, Pending.
U.S. Appl. No. 15/624,792, Pending.
U.S. Appl. No. 15/626,832, Pending.
U.S. Appl. No. 15/625,428, Allowed.
U.S. Appl. No. 14/978,834, Patented as U.S. Pat. No. 9,721,605.
U.S. Appl. No. 14/757,555, Patented as U.S. Pat. No. 9,711,174.
U.S. Appl. No. 15/197,046, Patented as U.S. Pat. No. 9,721,607.
U.S. Appl. No. 15/380,336, Pending.
U.S. Appl. No. 15/614,876, Allowed.
U.S. Appl. No. 15/620,916, Pending.
U.S. Appl. No. 15/621,464, Allowed.
U.S. Appl. No. 15/626,720, Allowed.
U.S. Appl. No. 15/854,383, Pending.
U.S. Appl. No. 15/854,507, Patented as U.S. Pat. No. 9,984,716.
U.S. Appl. No. 15/854,439, Pending.
U.S. Appl. No. 15/854,506, Patented as U.S. Pat. No. 10,008,230.
U.S. Appl. No. 15/848,173, Allowed.
U.S. Appl. No. 15/628,814, Allowed.
U.S. Appl. No. 15/690,400, Pending.
U.S. Appl. No. 15/690,906, Pending.
U.S. Appl. No. 15/626,355, Allowed.
U.S. Appl. No. 15/627,696, Pending.
U.S. Appl. No. 14/870,618, Patented as U.S. Pat. No. 9,959,894.
U.S. Appl. No. 15/388,911, Pending.
U.S. Appl. No. 14/753,227, Patented as U.S. Pat. No. 9,601,146.
U.S. Appl. No. 15/380,309, Allowed.
U.S. Appl. No. 15/388,864, Patented as U.S. Pat. No. 9,773,519.
U.S. Appl. No. 15/072,550, Patented as U.S. Pat. No. 9,704,525.
U.S. Appl. No. 15/615,871, Patented as U.S. Pat. No. 10,074,393.
U.S. Appl. No. 15/854,410, Patented as U.S. Pat. No. 9,972,351.
U.S. Appl. No. 15/378,907, Patented as U.S. Pat. No. 9,984,710.
U.S. Appl. No. 15/241,631, Patented as U.S. Pat. No. 10,026,435.
U.S. Appl. No. 14/209,065, Patented as U.S. Pat. No. 9,530,444.
U.S. Appl. No. 15/854,474, Patented as U.S. Pat. No. 9,978,414.
U.S. Appl. No. 15/854,403, Pending.
U.S. Appl. No. 15/241,297, Patented as U.S. Pat. No. 10,026,434.
U.S. Appl. No. 15/241,286, Patented as U.S. Pat. No. 10,026,433.
U.S. Appl. No. 15/464,991, Patented as U.S. Pat. No. 9,779,772.
U.S. Appl. No. 14/867,752, Patented as U.S. Pat. No. 10,026,430.
U.S. Appl. No. 15/854,438, Allowed.
U.S. Appl. No. 15/854,409, Allowed.
U.S. Appl. No. 15/443,026, Pending.
U.S. Appl. No. 15/920,782, Patented as U.S. Pat. No. 10,134,433.
U.S. Appl. No. 15/920,563, Allowed.
U.S. Appl. No. 15/920,533, Pending.
U.S. Appl. No. 15/900,144, Pending.
U.S. Appl. No. 15/900,080, Pending.
U.S. Appl. No. 15/900,230, Pending.
U.S. Appl. No. 15/900,164, Allowed.
U.S. Appl. No. 15/920,518, Pending.
U.S. Appl. No. 15/899,587, Pending.
U.S. Appl. No. 15/899,430, Allowed.
U.S. Appl. No. 15/920,515, Allowed.
U.S. Appl. No. 15/920,517, Allowed.
U.S. Appl. No. 15/920,538, Allowed.
U.S. Appl. No. 15/920,544, Allowed.
U.S. Appl. No. 15/920,768, Allowed.
U.S. Appl. No. 16/009,603, Allowed.
U.S. Appl. No. 16/182,083, Pending (Continuation of U.S. Appl. No. 15/920,768).
U.S. Appl. No. 15/705,531, Pending.
U.S. Appl. No. 16/232,165, Pending (Continuation of U.S. Appl. No. 15/854,438).
U.S. Appl. No. 16/100,289, Allowed.
U.S. Appl. No. 16/038,669, Pending.
U.S. Appl. No. 15/900,106, Allowed.
U.S. Appl. No. 15/900,412, Patented as U.S. Pat. No. 10,062,403.
U.S. Appl. No. 15/900,141, Pending.
U.S. Appl. No. 15/900,160, Pending.
U.S. Appl. No. 15/900,345, Pending.
U.S. Appl. No. 15/900,379, Allowed.
U.S. Appl. No. 16/012,018, Pending.
U.S. Appl. No. 15/900,242, Allowed.
U.S. Appl. No. 15/900,334, Pending.
U.S. Appl. No. 15/920,592, Pending.
U.S. Appl. No. 15/920,635, Patented as U.S. Pat. No. 10,170,144.
U.S. Appl. No. 16/160,377, Pending.
U.S. Appl. No. 15/443,094, Pending.
U.S. Appl. No. 15/442,961, Pending.
U.S. Appl. No. 16/038,687, Pending.
U.S. Appl. No. 16/038,514, Pending.
U.S. Appl. No. 16/038,545, Pending.
U.S. Appl. No. 16/037,596, Pending.
U.S. Appl. No. 16/038,771, Pending.
U.S. Appl. No. 16/037,564, Pending.
U.S. Appl. No. 16/038,339, Allowed.
U.S. Appl. No. 16/037,573, Pending.
U.S. Appl. No. 16/037,681, Pending.
U.S. Appl. No. 16/038,884, Pending.
U.S. Appl. No. 16/038,847, Pending.
U.S. Appl. No. 16/044,574, Allowed.
U.S. Appl. No. 16/142,560, Pending.
U.S. Appl. No. 16/184,312, Pending.
U.S. Appl. No. 16/143,646, Pending.
Notice of Allowance dated Jul. 16, 2019 in U.S. Appl. No. 15/900,144.
Notice of Allowance dated Jun. 25, 2019 in U.S. Appl. No. 15/620,916.
Notice of Allowance dated Jun. 27, 2019 in U.S. Appl. No. 15/854,439.
Notice of Allowance dated Jun. 6, 2019 in U.S. Appl. No. 15/854,383.
Notice of Allowance dated May 24, 2019 in U.S. Appl. No. 15/900,345.
Notice of Allowance dated May 24, 2019 in U.S. Appl. No. 16/143,646.
Notice of Allowance dated May 29, 2019 in U.S. Appl. No. 15/900,334.
Notice of Allowance dated May 30, 2019 in U.S. Appl. No. 15/900,230.
Office Action dated Jun. 10, 2019 in U.S. Appl. No. 15/920,518.
Office Action dated Jun. 25, 2019 in Japanese Application No. 2015-245144.
Office Action dated Jun. 6, 2019 in U.S. Appl. No. 15/899,587.
Office Action dated May 23, 2019 in U.S. Appl. No. 15/388,911.
Notice of Allowance dated May 29, 2019 in U.S. Appl. No. 15/900,160.
Office Action dated Jul. 16, 2019 in Japanese Application No. 2016-124933.
Notice of Allowance dated Jul. 31, 2019 in U.S. Appl. No. 16/100,289.

(56) References Cited

OTHER PUBLICATIONS

Notice of Allowance dated Jul. 31, 2019 in U.S. Appl. No. 16/143,646.
Office Action dated Aug. 6, 2019 in Japanese Application No. 2016-254421.
Office Action dated Aug. 6, 2019 in Japanese Application No. 2016-254427.

* cited by examiner

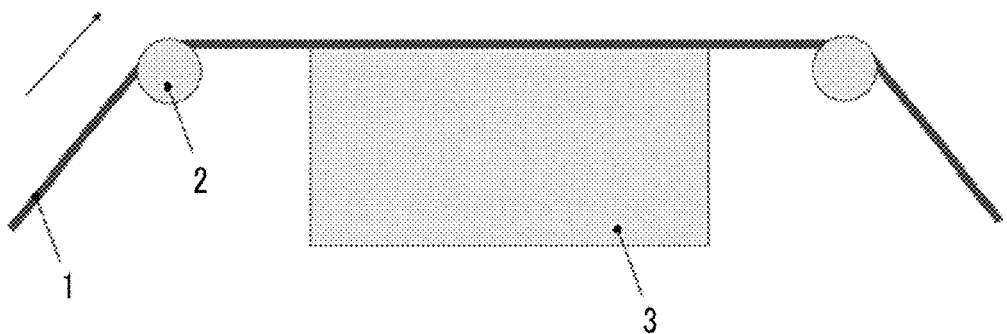

MAGNETIC TAPE HAVING CHARACTERIZED MAGNETIC LAYER

CROSS-REFERENCE TO RELATED APPLICATIONS

This application claims priority under 35 U.S.C. 119 to Japanese Patent Application No. 2017-065751 filed on Mar. 29, 2017. The above application is hereby expressly incorporated by reference, in its entirety, into the present application.

BACKGROUND OF THE INVENTION

1. Field of the Invention

The present invention relates to a magnetic tape.

2. Description of the Related Art

Magnetic recording media are divided into tape-shaped magnetic recording media and disk-shaped magnetic recording media, and tape-shaped magnetic recording media, that is, magnetic tapes are mainly used for data storage such as data back-up. The recording and/or reproducing of information to the magnetic tape are normally performed by mounting a magnetic tape cartridge including the magnetic tape on a drive, allowing the magnetic tape to run in the drive, and bringing the surface of the magnetic tape (surface of a magnetic layer) to come into contact with a magnetic head to slide thereon. Hereinafter, the magnetic tape is simply referred to as a "tape" and the magnetic head is also simply referred to as a "head".

For example, in order to continuously or intermittently repeatedly reproduce the information recorded on the magnetic tape, repeated running of the magnetic tape is performed in the drive (hereinafter, also simply referred to as "repeated running"). It is desired that a deterioration of electromagnetic conversion characteristics during such repeated running is prevented, from a viewpoint of increasing reliability of the magnetic tape for data storage use. This is because a magnetic tape, in which electromagnetic conversion characteristics during the repeated running are hardly deteriorated, can continuously exhibit excellent electromagnetic conversion characteristics, even in a case where the running is continuously or intermittently repeated in a drive.

As a reason of a deterioration of electromagnetic conversion characteristics due to the repeated running, occurrence of a phenomenon (called a "spacing loss") in which a distance between a surface of a magnetic layer and a head is widened, is exemplified. As a reason of this spacing loss, attachment of foreign materials derived from a tape to a head, while a surface of a magnetic layer and a head continue the sliding during the repeated running, that is, generation of head attached materials is exemplified. In the related art, as a measure against the generation of the head attached materials, an abrasive has been included in the magnetic layer, in order to impart a function of removing the head attached materials to the surface of the magnetic layer (for example, see JP2014-179149A). Hereinafter, the function of the surface of the magnetic layer of removing the head attached materials is referred to as "abrasion properties of the surface of the magnetic layer" or simply "abrasion properties".

SUMMARY OF THE INVENTION

JP2014-179149A discloses that a magnetic tape disclosed in JP2014-179149A can exhibit excellent electromagnetic conversion characteristics. In order to increase reliability of such a magnetic tape capable of exhibiting excellent electromagnetic conversion characteristics, for use of data storage, it is desired that a deterioration of electromagnetic conversion characteristics during the repeated running is prevented. Therefore, the inventors have made intensive research in order to find means for preventing a deterioration of electromagnetic conversion characteristics during the repeated running of the magnetic tape. From such research, the inventors have focused that, not only generation of head attached materials is a reason of spacing loss, but also partial chipping of a head can be a reason of spacing loss. Specific description is as follows. By increasing abrasion properties of a surface of a magnetic layer, the spacing loss caused by the head attached materials can be reduced. However, as abrasion properties of the surface of the magnetic layer increase, the head easily partially chips due to the sliding between the surface of the magnetic layer and the head. In a case where partial chipping of the head occurs, a distance between the surface of the magnetic layer and the head in the chipped portion is widened. This may also be a reason of the spacing loss.

In regards to abrasion properties of the surface of the magnetic layer, as disclosed in JP2014-179149A, as an abrasive is present in the magnetic layer in a fine state, abrasion properties tend to be deteriorated. The partial chipping of the head can be prevented by the deterioration of the abrasion properties, but the head attached materials are hardly removed. As described above, a decrease in the amount of the head attached materials and the partial chipping of the head are in a relationship of the tradeoff.

Meanwhile, in order to increase recording capacity for 1 reel of a magnetic tape cartridge, it is desired to increase the total length of the magnetic tape accommodated in 1 reel of the magnetic tape cartridge by decreasing the total thickness of the magnetic tape (that is, thinning the magnetic tape). As one method of thinning the magnetic tape, a method of decreasing the total thickness of a non-magnetic layer and a magnetic layer of a magnetic tape including the non-magnetic layer and the magnetic layer on a non-magnetic support in this order is used. However, in such studies of the inventor, it was clear that, it was difficult to overcome the relationship of the tradeoff to prevent a deterioration of electromagnetic conversion characteristics during the repeated running in a low temperature and high humidity environment, in a magnetic tape having a decreased total thickness of a non-magnetic layer and a magnetic layer which is equal to or smaller than 0.60 μm, compared to a magnetic tape having the total thickness of a non-magnetic layer and a magnetic layer which exceeds 0.60 μm. Hereinafter, the deterioration of electromagnetic conversion characteristics indicates a deterioration of electromagnetic conversion characteristics in a low temperature and high humidity environment, unless otherwise noted. The low temperature and high humidity environment can be, for example, an environment in which an atmosphere temperature is 10° C. to 20° C. and a relative humidity is 70% to 90%. The magnetic tape may also be used in the low temperature and high humidity environment, and therefore, it is desired that a deterioration of electromagnetic conversion characteristics during the repeated running is prevented in such an environment.

Therefore, an object of the invention is to provide a magnetic tape which has the total thickness of a non-magnetic layer and a magnetic layer equal to or smaller than 0.60 μm and in which electromagnetic conversion characteristics are hardly deteriorated, even in a case where the running is repeated in a low temperature and high humidity environment.

According to one aspect of the invention, there is provided a magnetic tape comprising: a non-magnetic support; a non-magnetic layer including non-magnetic powder and a binding agent on the non-magnetic support; and a magnetic layer including ferromagnetic powder and a binding agent on the non-magnetic layer, in which a total thickness of the non-magnetic layer and the magnetic layer is equal to or smaller than 0.60 μm, the magnetic layer includes an abrasive and fatty acid ester, a percentage of a plan view maximum area of the abrasive confirmed in a region having a size of 4.3 μm×6.3 μm of a surface of the magnetic layer with respect to the total area of the region, obtained by plane observation performed by using a scanning electron microscope is equal to or greater than 0.02% and less than 0.06%, a full width at half maximum of spacing distribution measured by optical interferometry regarding the surface of the magnetic layer before performing a vacuum heating with respect to the magnetic tape is greater than 0 nm and equal to or smaller than 7.0 nm, a full width at half maximum of spacing distribution measured by optical interferometry regarding the surface of the magnetic layer after performing the vacuum heating with respect to the magnetic tape is greater than 0 nm and equal to or smaller than 7.0 nm, and a difference ($S_{after} - S_{before}$) between a spacing $S_{after}$ measured by optical interferometry regarding the surface of the magnetic layer after performing the vacuum heating with respect to the magnetic tape and a spacing $S_{before}$ measured by optical interferometry regarding the surface of the magnetic layer before performing the vacuum heating with respect to the magnetic tape is greater than 0 nm and equal to or smaller than 8.0 nm.

The magnetic tape includes an abrasive in the magnetic layer. The abrasive is present in the magnetic layer in a state where a percentage of a plan view maximum area of the abrasive confirmed in a region having a size of 4.3 μm×6.3 μm of the surface of the magnetic layer by plane observation using a scanning electron microscope (SEM), with respect to the total area (100%) of the region is equal to or greater than 0.02% and less than 0.06%. Details of a measurement method of the percentage of the plan view maximum area of the abrasive with respect to the total area of the region (hereinafter, also referred to as a "plan view maximum area percentage of the abrasive" or simply a "percentage") will be described later.

Hereinafter, the full width at half maximum (FWHM) of spacing distribution measured by optical interferometry regarding the surface of the magnetic layer before performing the vacuum heating with respect to the magnetic tape is also referred to as "$FWHM_{before}$" and the full width at half maximum of spacing distribution measured by optical interferometry regarding the surface of the magnetic layer after performing the vacuum heating with respect to the magnetic tape is also referred to as "$FWHM_{after}$". The difference between a spacing $S_{after}$ measured by optical interferometry regarding the surface of the magnetic layer after performing the vacuum heating with respect to the magnetic tape and a spacing $S_{before}$ measured by optical interferometry regarding the surface of the magnetic layer before performing the vacuum heating with respect to the magnetic tape is also referred to as a "difference ($S_{after} - S_{before}$)". The $FWHM_{after}$ and the spacing $S_{after}$ for acquiring the difference ($S_{after} - S_{before}$) are values acquired after performing the vacuum heating with respect to the magnetic tape. In the invention and the specification, the "vacuum heating" of the magnetic tape is performed by holding the magnetic tape in an environment of a pressure of 200 Pa to 0.01 MPa and at an atmosphere temperature of 70° C. to 90° C. for 24 hours.

In the invention and the specification, the spacing measured by optical interferometry regarding the surface of the magnetic layer of the magnetic tape is a value measured by the following method.

In a state where the magnetic tape and a transparent plate-shaped member (for example, glass plate or the like) are overlapped with each other so that the surface of the magnetic layer of the magnetic tape faces the transparent plate-shaped member, a pressing member is pressed against the side of the magnetic tape opposite to the magnetic layer side at a pressure of $5.05 \times 10^4$ N/m (0.5 atm). In this state, the surface of the magnetic layer of the magnetic tape is irradiated with light through the transparent plate-shaped member (irradiation region: 150,000 to 200,000 μm$^2$), and a spacing (distance) between the surface of the magnetic layer of the magnetic tape and the surface of the transparent plate-shaped member on the magnetic tape side is acquired based on intensity (for example, contrast of interference fringe image) of interference light generated due to a difference in a light path between reflected light from the surface of the magnetic layer of the magnetic tape and reflected light from the surface of the transparent plate-shaped member on the magnetic tape side. The light emitted here is not particularly limited. In a case where the emitted light is light having an emission wavelength over a comparatively wide wavelength range as white light including light having a plurality of wavelengths, a member having a function of selectively cutting light having a specific wavelength or a wavelength other than wavelengths in a specific wavelength range, such as an interference filter, is disposed between the transparent plate-shaped member and a light reception unit which receives reflected light, and light at some wavelengths or in some wavelength ranges of the reflected light is selectively incident to the light reception unit. In a case where the light emitted is light (so-called monochromatic light) having a single luminescence peak, the member described above may not be used. The wavelength of light incident to the light reception unit can be set to be 500 to 700 nm, for example. However, the wavelength of light incident to the light reception unit is not limited to be in the range described above. In addition, the transparent plate-shaped member may be a member having transparency through which emitted light passes, to the extent that the magnetic tape is irradiated with light through this member and interference light is obtained.

The measurement described above can be performed by using a commercially available tape spacing analyzer (TSA) such as Tape Spacing Analyzer manufactured by Micro Physics, Inc., for example. The spacing measurement of the examples was performed by using Tape Spacing Analyzer manufactured by Micro Physics, Inc.

In addition, the full width at half maximum of spacing distribution of the invention and the specification is a full width at half maximum (FWHM), in a case where the interference fringe image obtained by the measurement of the spacing described above is divided into 300,000 points, a spacing of each point (distance between the surface of the magnetic layer of the magnetic tape and the surface of the transparent plate-shaped member on the magnetic tape side) is acquired, this spacing is shown with a histogram, and this histogram is fit with Gaussian distribution.

Further, the difference ($S_{after} - S_{before}$) is a value obtained by subtracting a mode before the vacuum heating from a mode after the vacuum heating of the 300,000 points.

In one aspect, the percentage of a plan view maximum area of the abrasive confirmed in a region having a size of 4.3 μm×6.3 μm of the surface of the magnetic layer with respect to the total area of the region, obtained by plane observation performed by using a scanning electron microscope is 0.02% to 0.05%.

In one aspect, the total thickness of the non-magnetic layer and the magnetic layer is 0.20 μm to 0.60 μm.

In one aspect, the $FWHM_{before}$ is 3.0 nm to 7.0 nm.

In one aspect, the $FWHM_{after}$ is 3.0 nm to 7.0 nm.

In one aspect, the difference ($S_{after}-S_{before}$) is 2.0 nm to 8.0 nm.

In one aspect, a Brunauer-Emmett-Teller (BET) specific surface area of the abrasive is 14 to 40 $m^2/g$.

In one aspect, the abrasive is alumina powder.

In one aspect, the magnetic layer includes an aromatic hydrocarbon compound including a phenolic hydroxyl group.

In one aspect, ferromagnetic powder is ferromagnetic hexagonal ferrite powder.

In one aspect, the ferromagnetic hexagonal ferrite powder includes Al.

According to one aspect of the invention, it is possible to provide a magnetic tape which has the total thickness of a non-magnetic layer and a magnetic layer equal to or smaller than 0.60 μm and in which electromagnetic conversion characteristics during the repeated running are hardly deteriorated in a low temperature and high humidity environment.

BRIEF DESCRIPTION OF THE DRAWING

FIG. 1 is a schematic configuration diagram of a vibration imparting device used in examples.

DESCRIPTION OF THE PREFERRED EMBODIMENTS

According to one aspect of the invention, there is provided a magnetic tape including: a non-magnetic support; a non-magnetic layer including non-magnetic powder and a binding agent on the non-magnetic support; and a magnetic layer including ferromagnetic powder and a binding agent on the non-magnetic layer, in which the total thickness of the non-magnetic layer and the magnetic layer is equal to or smaller than 0.60 μm, the magnetic layer includes an abrasive and fatty acid ester, a percentage of a plan view maximum area of the abrasive confirmed in a region having a size of 4.3 μm×6.3 μm of the surface of the magnetic layer with respect to the total area of the region, obtained by plane observation performed by using a scanning electron microscope is equal to or greater than 0.02% and less than 0.06%, a full width at half maximum of spacing distribution measured by optical interferometry regarding the surface of the magnetic layer before performing a vacuum heating with respect to the magnetic tape ($FWHM_{before}$) is greater than 0 nm and equal to or smaller than 7.0 nm, a full width at half maximum of spacing distribution measured by optical interferometry regarding the surface of the magnetic layer after performing the vacuum heating with respect to the magnetic tape ($FWHM_{after}$) is greater than 0 nm and equal to or smaller than 7.0 nm, and a difference ($S_{after}-S_{before}$) between a spacing $S_{after}$ measured by optical interferometry regarding the surface of the magnetic layer after performing the vacuum heating with respect to the magnetic tape and a spacing $S_{before}$ measured by optical interferometry regarding the surface of the magnetic layer before performing the vacuum heating with respect to the magnetic tape is greater than 0 nm and equal to or smaller than 8.0 nm.

The following description contains surmise of the inventor. The invention is not limited by such surmise.

The surmise of the inventors regarding the magnetic tape is as follows.

(1) As described above, it was clear that, it was difficult to prevent a deterioration of electromagnetic conversion characteristics during the repeated running in a low temperature and high humidity environment, in a magnetic tape having a decreased total thickness of a non-magnetic layer and a magnetic layer which is equal to or smaller than 0.60 μm, compared to a magnetic tape having the total thickness of a non-magnetic layer and a magnetic layer which exceeds 0.60 μm. The reason thereof may be a change of a contact state between the surface of the magnetic layer and the head due to a decrease of only the total thickness of the non-magnetic layer and the magnetic layer. Due to such a change of the contact state, the inventors have surmised that a phenomenon that the head easily partially chips due to the abrasive present in the magnetic layer may be one of the reasons of the spacing loss. In regards to this point, the inventors have considered that a state of the abrasive present in the magnetic layer which is in a state satisfying a percentage which will be described later in detail, indicates that the abrasive is present in the magnetic layer in a fine state. The inventors have surmised that this contributes to the prevention of partial chipping of the head during the repeated running.

(2) However, in a case where the abrasive is only simply present in the magnetic layer in a fine state, abrasion properties of the surface of the magnetic layer are deteriorated. That is, a function of removing head attached materials by the surface of the magnetic layer are deteriorated. In regards to this point, the inventors have investigated for preventing occurrence of spacing loss due to head attached materials, even in a case where the abrasive is present in the magnetic layer in a fine state, by preventing generation of foreign materials derived from the tape, and as a result, the inventors have thought that the $FWHM_{before}$, the $FWHM_{after}$, and the difference ($S_{after}-S_{before}$) are respectively set to be in the ranges described above. More details thereof will be described later.

The inventors have surmised that, as a result of reducing the spacing loss by satisfying both of the prevention of partial chipping of the head and a decrease in the amount of the head attached materials as described above, it is possible to prevent a deterioration of electromagnetic conversion characteristics during the repeated running in the magnetic tape having a decreased total thickness of the non-magnetic layer and the magnetic layer which is equal to or smaller than 0.60 μm.

However, the invention is not limited to the surmises described above.

Hereinafter, the magnetic tape will be described more specifically.

In the invention and the specification, the "surface of the magnetic layer" is identical to the surface of the magnetic tape on the magnetic layer side. In the invention and the specification, the "ferromagnetic powder" means an aggregate of a plurality of ferromagnetic particles. The "aggregate" not only includes an aspect in which particles configuring the aggregate directly come into contact with each other, but also includes an aspect in which a binding agent, an additive, or the like is interposed between the particles. The points described above are also applied to various powder such as non-magnetic powder of the invention and the specification, in the same manner. The term "particles" may be used for describe powder.

Total Thickness of Non-Magnetic Layer and Magnetic Layer

The total thickness of the non-magnetic layer and the magnetic layer of the magnetic tape is equal to or smaller than 0.60 μm and preferably equal to or smaller than 0.50 μm, from a viewpoint of thinning the magnetic tape. In addition, the total thickness of the non-magnetic layer and the magnetic layer is, for example, equal to or greater than 0.10 μm or equal to or greater than 0.20 μm.

Various thicknesses such as a thickness of the non-magnetic layer and a thickness of the magnetic layer will be described later in detail. The thicknesses of various layers of the magnetic tape and the non-magnetic support can be acquired by a well-known film thickness measurement method. As an example, a cross section of the magnetic tape in a thickness direction is, for example, exposed by a well-known method of ion beams or microtome, and the exposed cross section is observed with a scanning electron microscope. In the cross section observation, various thicknesses can be acquired as a thickness acquired at one position of the cross section in the thickness direction, or an arithmetical mean of thicknesses acquired at a plurality of positions of two or more positions, for example, two positions which are arbitrarily extracted. In addition, the thickness of each layer may be acquired as a designed thickness calculated according to the manufacturing conditions.

State of Abrasive Present in Magnetic Layer

The magnetic tape includes an abrasive in the magnetic layer. The abrasive is present in the magnetic layer in a state where a percentage of a plan view maximum area of the abrasive confirmed in a region having a size of 4.3 μm×6.3 μm of the surface of the magnetic layer by plane observation performed using a scanning electron microscope (SEM), with respect to the total area (100%) of the region is equal to or greater than 0.02% and less than 0.06%. The inventors have surmised that the abrasive present in the magnetic layer in a state where the percentage is equal to or greater than 0.02% contributes to the removal of the head attached materials, and the abrasive present in the magnetic layer in a state where the percentage is less than 0.06% contributes to the prevention of partial chipping of the head. Accordingly, the inventors have surmised that, the prevention of occurrence of spacing loss contributes to the prevention of a deterioration of electromagnetic conversion characteristics during the repeated running in a low temperature and high humidity environment. The percentage is preferably 0.02% to 0.05% and more preferably 0.02% to 0.04%.

In the magnetic tape having the total thickness of the non-magnetic layer and the magnetic layer equal to or smaller than 0.60 μm, in addition to allowing the abrasive to be present in the magnetic layer in a state where the percentage is equal to or greater than 0.02% and less than 0.06%, setting the $FWHM_{before}$, the $FWHM_{after}$, and the difference ($S_{after}-S_{before}$) respectively to be in the ranges described above contribute to the prevention of a deterioration of electromagnetic conversion characteristics during the repeated running in a low temperature and high humidity environment. This point will be described later in detail.

Measurement Method

The plan view maximum area of the abrasive described above is acquired by plane observation performed by using a scanning electron microscope. As the scanning electron microscope, a field emission (FE) type scanning electron microscope (FE-SEM) is used. A scanning electron microscope image (SEM image) obtained by plane-observing and imaging the surface of the magnetic layer from the top by using the FE-SEM under the conditions of an acceleration voltage of 5 kV, a working distance (W.D.) of 8 mm, and a magnification ratio of imaging of 20,000 times, is analyzed and accordingly, the plan view maximum area of the abrasive is acquired. The percentage is calculated from the acquired plan view maximum area. Specific procedure is as follows.

1. Acquiring of SEM Image

An acceleration voltage is set as 5 kV, a working distance (W.D.) is set as 8 mm, and a magnification ratio of imaging is set as 20,000 times, and a SEM image is acquired as a secondary electron image, without performing a sample coating before the imaging. As the scanning electron microscope (FE-SEM), FE-SEM S4800 manufactured by Hitachi, Ltd. can be used, for example. Values of Examples and Comparative Examples which will be described later are values obtained by using FE-SEM S4800 manufactured by Hitachi, Ltd. as the FE-SEM and setting a probe current as Normal.

2. Image Analysis

The image analysis of the SEM image acquired in the section 1. is performed by the following procedure by using WinROOF manufactured by Mitani Corporation as image analysis software. An area of each portion described below is acquired as a value using a pixel as a unit.

(1) The image data (SEM (20K) jpg image) of the SEM image acquired in the section 1. is dragged-and-dropped in WinROOF.

(2) A region having a size of 4.3 μm×6.3 μm of the image excluding a part where a magnification and a scale are displayed, is selected as an analysis region.

(3) The image in the analysis region is subjected to binarization processing. Specifically, 150 gradation is selected as a lower limit value, 255 gradation is selected as an upper limit value, and the binarization processing is performed by setting the lower limit value and the upper limit value as threshold values.

(4) By performing the binarization processing, an area of each white shining portion of the analysis region is acquired. Specifically, a command of measurement→shape characteristics→area is executed in the image analysis software WinROOF.

(5) The total area (4.3 μm×6.3 μm) of the analysis region is set as 100%, a percentage of the area of each portion acquired in (4) with respect to the total area is calculated, and a maximum value of the percentage of the area of each portion is acquired.

(6) The procedure of (2) to (5) is executed four times by changing the position of the analysis region (N=4).

(7) An arithmetical mean (that is, arithmetical mean of four maximum values) of the maximum values respectively acquired in (5) during the execution of the procedure four times is calculated, and the calculated value is set as the plan view maximum area of the abrasive. A percentage of the plan view maximum area acquired as described above occupying the total area of the analysis region is calculated and the calculated percentage is set as the plan view maximum area percentage of the abrasive.

Adjustment Method

By allowing the abrasive to be present in the magnetic layer in a fine state, it is possible to realize a state where the abrasive is present in the magnetic layer in a state where the percentage is equal to or greater than 0.02% and less than 0.06%. In order to allow the abrasive to be present in the magnetic layer in a fine state, it is preferable that an abrasive having a small particle size is used, the aggregate of the abrasive is prevented and the abrasive is dispersed in the magnetic layer without being unevenly distributed. As one method thereof, a method of reinforcing the dispersion conditions of the abrasive at the time of preparing a magnetic layer forming composition is used. For example, separate dispersing the abrasive and the ferromagnetic powder is one aspect of the reinforcement of the dispersion conditions. The separate dispersing is more specifically a method of preparing a magnetic layer forming composition through a step of mixing an abrasive liquid including an abrasive and a solvent (here, substantially not including ferromagnetic powder) with a magnetic solution including the ferromagnetic powder, a solvent, and a binding agent. By performing the mixing after separately dispersing the abrasive and the ferromagnetic powder as described above, it is possible to increase dispersibility of the abrasive of the magnetic layer forming composition. The expression of "substantially not including ferromagnetic powder" means that the ferromagnetic powder is not added as a constituent component of the abrasive liquid, and a small amount of the ferromagnetic powder present as impurities being mixed without intention is allowed. By arbitrarily combining methods such as use of dispersion media having a small size (for example, decreasing a diameter of dispersion beads in beads dispersion), a high degree of filling of dispersion media of a dispersion device, and a dispersing process performed for a long time, other than the separate dispersing or in addition to the separate dispersing, it is possible to reinforce the dispersion conditions. In a case of performing the filtering by using a filter in the preparation of the magnetic layer forming composition, a filter having a small hole diameter tends to cause the abrasive to be present in the magnetic layer in a fine state.

Dispersing Agent

In addition, the use of a dispersing agent for improving dispersibility of the abrasive can also be one aspect of the reinforcement of the dispersion conditions of the abrasive. Here, the dispersing agent for improving dispersibility of the abrasive is a component which can increase dispersibility of the abrasive in the magnetic layer forming composition and/or the abrasive liquid, compared to a state where this agent is not present. As a compound which can function as such a dispersing agent, an aromatic hydrocarbon compound including a phenolic hydroxyl group can be used. The "phenolic hydroxyl group" is a hydroxyl group directly combined with an aromatic ring. The aromatic ring included in the aromatic hydrocarbon compound may have a monocyclic or polycyclic structure, or may a fused ring. From a viewpoint of improving dispersibility of the abrasive, an aromatic hydrocarbon compound including a benzene ring or a naphthalene ring is preferable. In addition, the aromatic hydrocarbon compound may include a substituent other than the phenolic hydroxyl group. Examples of the substituent other than the phenolic hydroxyl group include a halogen atom, an alkyl group, an alkoxy group, an amino group, an acyl group, a nitro group, a nitroso group, and a hydroxyalkyl group, and a halogen atom, an alkyl group, an alkoxy group, an amino group, and a hydroxyalkyl group are preferable. The phenolic hydroxyl group included in one molecule of the aromatic hydrocarbon compound may be 1, 2, 3, or more.

As one preferable aspect of the aromatic hydrocarbon compound including a phenolic hydroxyl group, a compound represented by General Formula 100.

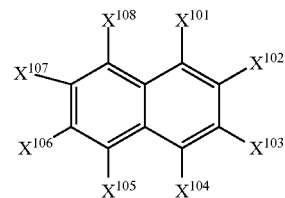

General Formula 100

[In General Formula 100, two of $X^{101}$ to $X^{108}$ are hydroxyl groups and other six components each independently represent a hydrogen atom or a substituent.

In the compound represented by General Formula 100, a site of substitution of the two hydroxyl groups (phenolic hydroxyl groups) is not particularly limited.

In the compound represented by General Formula 100, two of $X^{101}$ to $X^{108}$ are hydroxyl groups (phenolic hydroxyl groups) and other six components each independently represent a hydrogen atom or a substituent. In addition, among $X^{101}$ to $X^{108}$, all of portions other than the two hydroxyl groups may be hydrogen atoms or some or all of the portions may be substituents. As the substituent, the substituents described above can be used. As the substituent other than the two hydroxyl groups, one or more phenolic hydroxyl groups may be included. From a viewpoint of improving dispersibility of the abrasive, it is preferable that the components other than the two hydroxyl groups among $X^{101}$ to $X^{108}$ are not phenolic hydroxyl groups. That is, the compound represented by General Formula 100 is preferably dihydroxynaphthalene or a derivative thereof and more preferably 2,3-dihydroxynaphthalene or a derivative thereof. Examples of a preferable substituent as the substituent represented by $X^{101}$ to $X^{108}$ include a halogen atom (for example, a chlorine atom, a bromine atom), an amino group, an alkyl group having 1 to 6 (preferably 1 to 4) carbon atoms, a methoxy group and an ethoxy group, an acyl group, a nitro group, a nitroso group, and a —$CH_2OH$ group.

As the dispersing agent for improving dispersibility of the abrasive, descriptions disclosed in paragraphs 0024 to 0028 of JP2014-179149A can be referred to.

The content of the dispersing agent for improving dispersibility of the abrasive described above can be used, for example, 0.5 to 20.0 parts by mass and is preferably 1.0 to 10.0 parts by mass with respect to 100.0 parts by mass of the abrasive, at the time of preparing the magnetic layer forming composition, preferably at the time of preparing the abrasive liquid.

Abrasive

The "abrasive" means non-magnetic powder having Mohs hardness exceeding 8 and is preferably non-magnetic powder having Mohs hardness equal to or greater than 9. The abrasive may be powder of inorganic substances (inorganic powder) or may be powder of organic substances (organic powder). The abrasive is more preferably inorganic powder having Mohs hardness exceeding 8 and even more preferably inorganic powder having Mohs hardness equal to or greater than 9. A maximum value of Mohs hardness is 10 of diamond. Specifically, powders of alumina ($Al_2O_3$), silicon carbide, boron carbide ($B_4C$), TiC, cerium oxide, zirconium oxide ($ZrO_2$), diamond, and the like can be used as the abrasive, and among these, alumina powder is preferable. The aromatic hydrocarbon compound including a phenolic hydroxyl group described above is particularly preferably used as a dispersing agent for improving dispersibility of alumina powder. There are mainly two kinds of alumina having an alpha type crystal form and a gamma type crystal form. Both can be used, it is preferable to use alumina (α-alumina) having an alpha type crystal form, from viewpoints of realizing higher hardness and contributing to the improvement of abrasion properties and the improvement of the strength of the magnetic layer. A gelatinization ratio of α-alumina is preferably equal to or greater than 50% from a viewpoint of hardness. The shape of the particles of the abrasive may be any shape of an acicular shape, a spherical shape, and a dice shape.

In order to obtain a magnetic layer in which the abrasive is present in a fine state, it is preferable to use an abrasive having a small particle size as the abrasive. As an index of the particle size of the abrasive, a BET specific surface area can be used. A large BET specific surface area means a small particle size. From a viewpoint of a small particle size, the BET specific surface area of the abrasive is preferably equal to or greater than 14 $m^2/g$, more preferably equal to or greater than 15 $m^2/g$, even more preferably equal to or greater than 18 $m^2/g$, and still more preferably 20 $m^2/g$. In addition, from a viewpoint of ease of improvement of dispersibility, an abrasive having a BET specific surface area equal to or smaller than 40 $m^2/g$ is preferably used.

A preparing method of the magnetic layer forming composition including the abrasive will be described later in detail.

Difference ($S_{after}-S_{before}$)

The difference ($S_{after}-S_{before}$) of the spacings before and after the vacuum heating measured in the magnetic tape is greater than 0 nm and equal to or smaller than 8.0 nm. Regarding the difference ($S_{after}-S_{before}$), the inventors have thought that this value can be an index for a thickness of a liquid film formed on the surface of the magnetic layer with fatty acid ester included in the magnetic layer. Specific description is as follows.

A portion (projection) which mainly comes into contact (so-called real contact) with the head in a case where the magnetic tape and the head slide on each other, and a portion (hereinafter, referred to as a "base portion") having a height lower than that of the portion described above are normally present on the surface of the magnetic layer. The inventors have thought that the spacing described above is a value which is an index of a distance between the head and the base portion in a case where the magnetic tape and the head slide on each other. However, it is thought that, in a case where fatty acid ester included in the magnetic layer forms a liquid film on the surface of the magnetic layer, the liquid film is present between the base portion and the head, and thus, the spacing is narrowed by the thickness of the liquid film.

Meanwhile, the lubricant is generally divided broadly into a liquid lubricant and a boundary lubricant and fatty acid ester is known as a component which can function as a liquid lubricant. It is considered that fatty acid ester can protect the magnetic layer by forming a liquid film on the surface of the magnetic layer. The inventors have thought that the protection of the surface of the magnetic layer due to the presence of the liquid film of fatty acid ester contributes to preventing the surface of the magnetic layer from chipping due to the sliding on the head, and preventing cut scraps from becoming head attached materials. However, it is thought that an excessive amount of fatty acid ester present on the surface of the magnetic layer causes sticking due to strong adhesiveness due to formation of a meniscus (liquid crosslinking) between the surface of the magnetic layer and the head due to fatty acid ester.

In regards to this point, the inventors focused on the idea that fatty acid ester is a component having properties of volatilizing by vacuum heating, and the difference ($S_{after}-S_{before}$) of a spacing between a state after the vacuum heating (state in which a liquid film of fatty acid ester is volatilized and removed) and a state before the vacuum heating (state in which the liquid film of fatty acid ester is present) was used as an index for the thickness of the liquid film formed of fatty acid ester on the surface of the magnetic layer. The inventors have surmised that the presence of the liquid film of fatty acid ester on the surface of the magnetic layer, so that the value of the difference is greater than 0 nm and equal to or smaller than 8.0 nm, prevents generation of cut scraps due to chipping of the surface of the magnetic layer due to sliding on the head, while preventing sticking. From a viewpoint of further preventing chipping of the surface of the magnetic layer, the difference ($S_{after}-S_{before}$) is preferably equal to or greater than 0.1 nm, more preferably equal to or greater than 1.0 nm, even more preferably equal to or greater than 1.5 nm, still preferably equal to or greater than 2.0 nm, still more preferably equal to or greater than 2.5 nm, still furthermore preferably equal to or greater than 3.0 nm. Meanwhile, from a viewpoint of further preventing occurrence of sticking, the difference ($S_{after}-S_{before}$) is preferably equal to or smaller than 7.5 nm, more preferably equal to or smaller than 7.0 nm, even more preferably equal to or smaller than 6.5 nm, still preferably equal to or smaller than 6.0 nm, still more preferably equal to or smaller than 5.0 nm, still even more preferably equal to or smaller than 4.5 nm, and still even furthermore preferably equal to or smaller than 4.0 nm. The difference ($S_{after}-S_{before}$) can be controlled by the amount of fatty acid ester added to a magnetic layer forming composition. In addition, regarding the magnetic tape including a non-magnetic layer between the non-magnetic support and the magnetic layer, the difference ($S_{after}-S_{before}$) can be controlled by the amount of fatty acid ester added to a non-magnetic layer forming composition. This is because that the non-magnetic layer can play a role of holding a lubricant and supplying the lubricant to the magnetic layer, and fatty acid ester included in the non-magnetic layer may be moved to the magnetic layer and present in the surface of the magnetic layer.

$FWHM_{before}$ and $FWHM_{after}$

A smaller value of the full width at half maximum of spacing distribution means that a variation in the values of the spacing measured on each part of the surface of the magnetic layer is small. As a result of intensive studies, the inventors have thought that, in order to prevent sticking between the surface of the magnetic layer of the magnetic tape and the head and occurrence of chipping of the surface of the magnetic layer during the running, it is effective to increase uniformity of a contact state between the surface of the magnetic layer and the head, by increasing uniformity of a height of projections present on the surface of the magnetic layer and increasing uniformity of a thickness of a liquid film of fatty acid ester. The inventors have thought that an increase in uniformity of the contact state between the surface of the magnetic layer and the head is also effective to improvement of electromagnetic conversion characteristics, because a decrease in electromagnetic conversion characteristics due to spacing variation is prevented.

In regards to this point, it is considered that the reason for the variation in values of the spacing is a variation in height of the projection of the surface of the magnetic layer and a variation in the thickness of the liquid film fatty acid ester. The inventors have surmised that the full width at half maximum of the spacing distribution $FWHM_{before}$ measured before the vacuum heating, that is, in a state where the liquid film of fatty acid ester is present on the surface of the magnetic layer, becomes great, as the variation in height of the projection and the variation in the thickness of the liquid film of fatty acid ester are great. Particularly, the spacing distribution $FWHM_{before}$ is greatly affected by the variation in the thickness of the liquid film of fatty acid ester. In contrast, the inventors have surmised that the full width at half maximum of the spacing distribution $FWHM_{after}$ measured after the vacuum heating, that is, in a state where the liquid film of fatty acid ester is removed from the surface of the magnetic layer, becomes great, as the variation in height of the projection is great. That is, the inventors have surmised that small full widths at half maximum of spacing distributions $FWHM_{before}$ and $FWHM_{after}$ mean a small variation in the thickness of the liquid film of fatty acid ester on the surface of the magnetic layer and a small variation in height of the projection. The inventors have thought that it is possible to prevent sticking between the surface of the magnetic layer of the magnetic tape and the head and occurrence of chipping of the surface of the magnetic layer during running, and improve electromagnetic conversion characteristics, by increasing the uniformity of the height of the projection and the thickness of the liquid film of fatty acid ester so that the full widths at half maximum of the spacing distributions $FWHM_{before}$ and $FWHM_{after}$ are greater than 0 nm and equal to or smaller than 7.0 nm.

Both of the full width at half maximum of spacing distribution $FWHM_{before}$ before the vacuum heating and the full width at half maximum of spacing distribution $FWHM_{after}$ after the vacuum heating which are measured in the magnetic tape are greater than 0 nm and equal to or smaller than 7.0 nm. It is thought that this point contributes to the prevention of sticking of the surface of the magnetic layer of the magnetic tape and the head and occurrence of chipping of the surface of the magnetic layer during running. From a viewpoint of further preventing the sticking and occurrence of chipping of the surface of the magnetic layer, the $FWHM_{before}$ and the $FWHM_{after}$ are preferably equal to or smaller than 6.5 nm, more preferably equal to or smaller than 6.0 nm, even more preferably equal to or smaller than 5.5 nm, still more preferably equal to or smaller than 5.0 nm, and still even more preferably equal to or smaller than 4.5 nm. The $FWHM_{before}$ and the $FWHM_{after}$ can be, for example, equal to or greater than 0.5 nm, equal to or greater than 1.0 nm, equal to or greater than 2.0 nm, or equal to or greater than 3.0 nm. Meanwhile, from a viewpoint of preventing the sticking and occurrence of chipping of the surface of the magnetic layer, it tends to be preferable that the values thereof are small, and therefore, the values thereof may be smaller than the exemplified values.

The $FWHM_{before}$ measured before the vacuum heating can be decreased mainly by decreasing the variation in the thickness of the liquid film of fatty acid ester. An example of a specific method will be described later. Meanwhile, the $FWHM_{after}$ measured after the vacuum heating can be decreased by decreasing the variation in height of the projection of the surface of the magnetic layer. In order to realize the decrease described above, it is preferable that a presence state of the powder component included in the magnetic layer, for example, non-magnetic filler, which will be described later specifically, in the magnetic layer is controlled. An example of a specific method will be described later.

Next, the magnetic layer and the like of the magnetic tape will be described more specifically.

Magnetic Layer

Ferromagnetic Powder

As the ferromagnetic powder included in the magnetic layer, ferromagnetic powder normally used in the magnetic layer of various magnetic recording media can be used. It is preferable to use ferromagnetic powder having a small average particle size, from a viewpoint of improvement of recording density of the magnetic tape. From this viewpoint, ferromagnetic powder having an average particle size equal to or smaller than 50 nm is preferably used as the ferromagnetic powder. Meanwhile, the average particle size of the ferromagnetic powder is preferably equal to or greater than 10 nm, from a viewpoint of stability of magnetization.

As a preferred specific example of the ferromagnetic powder, ferromagnetic hexagonal ferrite powder can be used. An average particle size of the ferromagnetic hexagonal ferrite powder is preferably 10 nm to 50 nm and more preferably 20 nm to 50 nm, from a viewpoint of improvement of recording density and stability of magnetization.

As one aspect of the ferromagnetic hexagonal ferrite powder, ferromagnetic hexagonal ferrite powder including Al can be used. It is thought that, the ferromagnetic hexagonal ferrite powder is hardened by including Al and contributes to the improvement of strength of the magnetic layer. The Al content of the ferromagnetic hexagonal ferrite powder is preferably equal to or greater than 0.6 mass %, more preferably equal to or greater than 1.0 mass %, even more preferably equal to or greater than 2.0 mass %, and still more preferably equal to or greater than 3.0 mass % in terms of $Al_2O_3$, with respect to 100.0 mass % of the total mass of the ferromagnetic hexagonal ferrite powder. In addition, the Al content of the ferromagnetic hexagonal ferrite powder is preferably equal to or smaller than 12.0 mass %, more preferably equal to or smaller than 10.0 mass %, even more preferably equal to or smaller than 8.0 mass %, and still more preferably equal to or smaller than 6.0 mass % in terms of $Al_2O_3$, with respect to 100.0 mass % of the total mass of the ferromagnetic hexagonal ferrite powder.

Al may be present in the particle of the ferromagnetic hexagonal ferrite powder, may be adhered to the surface of the particle, or may be present in the particle and on the surface thereof.

The Al content of the ferromagnetic hexagonal ferrite powder can be calculated from an Al/Fe ratio acquired by inductively coupled plasma (ICP) analysis. In addition, the Al adhered to the surface of the particle can be confirmed by one or more analysis methods of: confirming that an Al/Fe ratio of a surface layer of a particle acquired by X-ray photoelectron spectroscopy (XPS) analysis becomes greater than the Al/Fe ratio acquired by the ICP analysis; observing localization of Al on the surface layer of the particle in Auger electron spectroscopy (AES) analysis; and confirming a coated film on the surface of the particle in a cross section observation performed by using a transmission electron microscope (TEM). It is surmised that Al present on the surface of the particle is normally in a state of an oxide.

For a preparation method of the ferromagnetic hexagonal ferrite powder including Al, description disclosed in paragraphs 0012 to 0030 of JP2011-225417A can be referred to. According to the preparation method disclosed in JP2011-225417A, the ferromagnetic hexagonal ferrite powder in which surfaces of primary particles of hexagonal ferrite particles are coated with Al can also be obtained by a glass crystallization method. In addition, for the preparation method of the ferromagnetic hexagonal ferrite powder including Al, description disclosed in a paragraph 0035 of JP2014-179149A can also be referred to.

For details of ferromagnetic hexagonal ferrite powder, for example, descriptions disclosed in paragraphs 0134 0136 of JP2011-216149A and paragraphs 0013 to 0030 of JP2012-204726A can be referred to.

As a preferred specific example of the ferromagnetic powder, ferromagnetic metal powder can also be used. An average particle size of the ferromagnetic metal powder is preferably 10 nm to 50 nm and more preferably 20 nm to 50 nm, from a viewpoint of improvement of recording density and stability of magnetization. For details of the ferromagnetic metal powder, descriptions disclosed in paragraphs 0137 to 0141 of JP2011-216149A and paragraphs 0009 to 0023 of JP2005-251351 can be referred to, for example.

In the invention and the specification, average particle sizes of various powder such as the ferromagnetic powder and the like are values measured by the following method with a transmission electron microscope, unless otherwise noted.

The powder is imaged at a magnification ratio of 100,000 with a transmission electron microscope, the image is printed on printing paper so that the total magnification of 500,000 to obtain an image of particles configuring the powder. A target particle is selected from the obtained image of particles, an outline of the particle is traced with a digitizer, and a size of the particle (primary particle) is measured. The primary particle is an independent particle which is not aggregated.

The measurement described above is performed regarding 500 particles arbitrarily extracted. An arithmetical mean of the particle size of 500 particles obtained as described above is an average particle size of the powder. As the transmission electron microscope, a transmission electron microscope H-9000 manufactured by Hitachi, Ltd. can be used, for example. In addition, the measurement of the particle size can be performed by well-known image analysis software, for example, image analysis software KS-400 manufactured by Carl Zeiss. The average particle size shown in examples which will be described later is a value measured by using transmission electron microscope H-9000 manufactured by Hitachi, Ltd. as the transmission electron microscope, and image analysis software KS-400 manufactured by Carl Zeiss as the image analysis software, unless otherwise noted.

As a method of collecting a sample powder from the magnetic tape in order to measure the particle size, a method disclosed in a paragraph of 0015 of JP2011-048878A can be used, for example.

In the invention and the specification, unless otherwise noted, (1) in a case where the shape of the particle observed in the particle image described above is a needle shape, a fusiform shape, or a columnar shape (here, a height is greater than a maximum long diameter of a bottom surface), the size (particle size) of the particles configuring the powder is shown as a length of a long axis configuring the particle, that is, a long axis length, (2) in a case where the shape of the particle is a planar shape or a columnar shape (here, a thickness or a height is smaller than a maximum long diameter of a plate surface or a bottom surface), the particle size is shown as a maximum long diameter of the plate surface or the bottom surface, and (3) in a case where the shape of the particle is a sphere shape, a polyhedron shape, or an unspecified shape, and the long axis configuring the particles cannot be specified from the shape, the particle size is shown as an equivalent circle diameter. The equivalent circle diameter is a value obtained by a circle projection method.

In addition, regarding an average acicular ratio of the powder, a length of a short axis, that is, a short axis length of the particles is measured in the measurement described above, a value of (long axis length/short axis length) of each particle is obtained, and an arithmetical mean of the values obtained regarding 500 particles is calculated. Here, unless otherwise noted, in a case of (1), the short axis length as the definition of the particle size is a length of a short axis configuring the particle, in a case of (2), the short axis length is a thickness or a height, and in a case of (3), the long axis and the short axis are not distinguished, thus, the value of (long axis length/short axis length) is assumed as 1, for convenience.

In addition, unless otherwise noted, in a case where the shape of the particle is specified, for example, in a case of definition of the particle size (1), the average particle size is an average long axis length, in a case of the definition (2), the average particle size is an average plate diameter, and an average plate ratio is an arithmetical mean of (maximum long diameter/thickness or height). In a case of the definition (3), the average particle size is an average diameter (also referred to as an average particle diameter).

The content (filling percentage) of the ferromagnetic powder of the magnetic layer is preferably 50 to 90 mass % and more preferably 60 to 90 mass %. The components other than the ferromagnetic powder of the magnetic layer are a binding agent, an abrasive, and fatty acid ester, and one or more kinds of additives may be arbitrarily included. A high filling percentage of the ferromagnetic powder in the magnetic layer is preferable from a viewpoint of improvement recording density.

Binding Agent

The magnetic tape is a coating type magnetic tape, and the magnetic layer includes a binding agent together with the ferromagnetic powder and the abrasive. As the binding agent, one or more kinds of resin is used. The resin may be a homopolymer or a copolymer. As the binding agent, various resins normally used as a binding agent of the coating type magnetic recording medium can be used. For example, as the binding agent, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. These resins can be used as the binding agent even in the non-magnetic layer and/or a back coating layer which will be described later. For the binding agent described above, description disclosed in paragraphs 0028 to 0031 of JP2010-24113A can be referred to. In addition, the binding agent may be a radiation curable resin such as an electron beam-curable resin. For the radiation curable resin, descriptions disclosed in paragraphs 0044 and 0045 of JP2011-048878A can be referred to.

An average molecular weight of the resin used as the binding agent can be, for example, 10,000 to 200,000 as a weight-average molecular weight. The weight-average molecular weight of the invention and the specification is a value obtained by performing polystyrene conversion of a value measured by gel permeation chromatography (GPC). As the measurement conditions, the following conditions can be used. The weight-average molecular weight shown in examples which will be described later is a value obtained by performing polystyrene conversion of a value measured under the following measurement conditions.

GPC device: HLC-8120 (manufactured by Tosoh Corporation)

Column: TSK gel Multipore HXL-M (manufactured by Tosoh Corporation, 7.8 mmID (inner diameter)×30.0 cm)

Eluent: Tetrahydrofuran (THF)

In addition, a curing agent can also be used together with the binding agent. As the curing agent, in one aspect, a thermosetting compound which is a compound in which a curing reaction (crosslinking reaction) proceeds due to heating can be used, and in another aspect, a photocurable compound in which a curing reaction (crosslinking reaction) proceeds due to light irradiation can be used. At least a part of the curing agent is included in the magnetic layer in a state of being reacted (crosslinked) with other components such as the binding agent, by proceeding the curing reaction in the magnetic layer forming step. The preferred curing agent is a thermosetting compound, polyisocyanate is suitable. For details of the polyisocyanate, descriptions disclosed in paragraphs 0124 and 0125 of JP2011-216149A can be referred to, for example. The amount of the curing agent can be, for example, 0 to 80.0 parts by mass with respect to 100.0 parts by mass of the binding agent in the magnetic layer forming composition, and is preferably 50.0 to 80.0 parts by mass, from a viewpoint of improvement of strength of each layer such as the magnetic layer.

Fatty Acid Ester

The magnetic tape includes fatty acid ester in the magnetic layer. The fatty acid ester may be included alone as one type or two or more types thereof may be included. Examples of fatty acid ester include esters of lauric acid, myristic acid, palmitic acid, stearic acid, oleic acid, linoleic acid, linolenic acid, behenic acid, erucic acid, and elaidic acid. Specific examples thereof include butyl myristate, butyl palmitate, butyl stearate (butyl stearate), neopentyl glycol dioleate, sorbitan monostearate, sorbitan distearate, sorbitan tristearate, oleyl oleate, isocetyl stearate, isotridecyl stearate, octyl stearate, isooctyl stearate, amyl stearate, and butoxyethyl stearate.

The content of fatty acid ester, as the content of the magnetic layer forming composition, is, for example, 0.1 to 10.0 parts by mass and is preferably 1.0 to 7.0 parts by mass with respect to 100.0 parts by mass of ferromagnetic powder. In a case of using two or more kinds of different fatty acid esters as the fatty acid ester, the content thereof is the total content thereof. In the invention and the specification, the same applies to content of other components, unless otherwise noted. In addition, in the invention and the specification, a given component may be used alone or used in combination of two or more kinds thereof, unless otherwise noted.

In a case where the magnetic tape includes a non-magnetic layer between the non-magnetic support and the magnetic layer, the content of fatty acid ester in a non-magnetic layer forming composition is, for example, 0 to 10.0 parts by mass and is preferably 0.1 to 8.0 parts by mass with respect to 100.0 parts by mass of non-magnetic powder.

Other Lubricants

The magnetic tape includes fatty acid ester which is one kind of lubricants at least in the magnetic layer. The lubricants other than fatty acid ester may be arbitrarily included in the magnetic layer and/or the non-magnetic layer. As described above, the lubricant included in the non-magnetic layer may be moved to the magnetic layer and present in the surface of the magnetic layer. As the lubricant which may be arbitrarily included, fatty acid can be used. In addition, fatty acid amide and the like can also be used. Fatty acid ester is known as a component which can function as a liquid lubricant, whereas fatty acid and fatty acid amide are known as a component which can function as a boundary lubricant. It is considered that the boundary lubricant is a lubricant which can be adsorbed to a surface of powder (for example, ferromagnetic powder) and form a rigid lubricant film to decrease contact friction.

Examples of fatty acid include lauric acid, myristic acid, palmitic acid, stearic acid, oleic acid, linoleic acid, linolenic acid, behenic acid, erucic acid, and elaidic acid, and stearic acid, myristic acid, and palmitic acid are preferable, and stearic acid is more preferable. Fatty acid may be included in the magnetic layer in a state of salt such as metal salt.

As fatty acid amide, amide of various fatty acid described above is used, and examples thereof include lauric acid amide, myristic acid amide, palmitic acid amide, and stearic acid amide.

Regarding fatty acid and a derivative of fatty acid (amide and ester), a part derived from fatty acid of the fatty acid derivative preferably has a structure which is the same as or similar to that of fatty acid used in combination. As an example, in a case of using stearic acid as fatty acid, it is preferable to use stearic acid ester and/or stearic acid amide.

The content of fatty acid in the magnetic layer forming composition is, for example, 0 to 10.0 parts by mass, preferably 0.1 to 10.0 parts by mass, and more preferably 1.0 to 7.0 parts by mass, with respect to 100.0 parts by mass of the ferromagnetic powder. The content of fatty acid amide in the magnetic layer forming composition is, for example, 0 to 3.0 parts by mass, preferably 0 to 2.0 parts by mass, and more preferably 0 to 1.0 part by mass with respect to 100.0 parts by mass of the ferromagnetic powder.

In a case where the magnetic tape includes a non-magnetic layer between the non-magnetic support and the magnetic layer, the content of fatty acid in the non-magnetic layer forming composition is, for example, 0 to 10.0 parts by mass, preferably 1.0 to 10.0 parts by mass, and more preferably 1.0 to 7.0 parts by mass with respect to 100.0 parts by mass of the non-magnetic powder. The content of fatty acid amide in the non-magnetic layer forming composition is, for example, 0 to 3.0 parts by mass and preferably 0 to 1.0 part by mass with respect to 100.0 parts by mass of the non-magnetic powder.

Additives

The magnetic layer includes ferromagnetic powder, a binding agent, an abrasive, and fatty acid ester, and may further include one or more kinds of additives, if necessary. As the additives, a commercially available product or an additive prepared by a well-known method can be suitably selected and used according to desired properties.

As specific examples of the additives, the dispersing agent, the curing agent described above, and various lubricants are used. The dispersing agent for improving dispersibility of the abrasive can also contribute to improvement of dispersibility of ferromagnetic powder. The dispersing agent for improving dispersibility of the ferromagnetic powder can also contribute to the improvement of dispersibility of the abrasive. In addition, examples of the additive which can be included in the magnetic layer include a non-magnetic filler, a dispersing assistant, an antibacterial agent, an antistatic agent, and an antioxidant. The non-magnetic filler is identical to the non-magnetic powder. As the non-magnetic filler, a non-magnetic filler (hereinafter, referred to as a "projection formation agent") which can function as a projection formation agent which forms projections suitably protruded from the surface of the magnetic layer can be used.

The projection formation agent may be powder of inorganic substances (inorganic powder) or powder of organic substances (organic powder), and is preferably powder of inorganic substances. In addition, carbon black is also preferable. An average particle size of carbon black is preferably equal to or greater than 20 nm and more preferably equal to or greater than 30 nm. In addition, the average particle size of carbon black is preferably equal to or smaller than 150 nm and more preferably equal to or smaller than 100 nm.

Examples of the inorganic powder include powder of inorganic oxide such as metal oxide, metal carbonate, metal sulfate, metal nitride, metal carbide, and metal sulfide, and specific examples thereof include powder of silicon oxide such as silicon dioxide, chromium oxide, α-iron oxide, goethite, corundum, silicon nitride, titanium dioxide, tin oxide, magnesium oxide, tungsten oxide, boron nitride, zinc oxide, calcium carbonate, calcium sulfate, barium sulfate, and molybdenum disulfide, or composite inorganic powder including two or more kinds thereof. The inorganic oxide powder is more preferable and silicon oxide powder is even more preferable.

The projection formation agent preferably has uniformity of the particle size, from a viewpoint of further improving electromagnetic conversion characteristics. From a viewpoint of availability of particles having high uniformity of the particle size, the projection formation agent is preferably colloidal particles. In the invention and the specification, the "colloidal particles" are particles which are not precipitated and dispersed to generate a colloidal dispersion, in a case where 1 g of the particles is added to 100 mL of at least one organic solvent of at least methyl ethyl ketone, cyclohexanone, toluene, or ethyl acetate, or a mixed solvent including two or more kinds of the solvent described above at an arbitrary mixing ratio. The average particle size of the colloidal particles is a value obtained by a method disclosed in a paragraph 0015 of JP2011-048878A as a measurement method of an average particle diameter. In a case where the non-magnetic filler used in the formation of the magnetic layer is available, it is possible to determine whether or not the non-magnetic filler included in the magnetic layer is colloidal particles, by evaluating whether or not such a non-magnetic filler has properties which are the properties of the colloidal particles described above. Alternatively, the determination can also be performed by evaluating whether or not the non-magnetic filler extracted from the magnetic layer has properties which are the properties of the colloidal particles described above. The extraction of the non-magnetic filler from the magnetic layer can be performed by the following method, for example.

1. 1 g of the magnetic layer is scraped off. The scraping can be performed, for example, by a razor blade.

2. A magnetic layer sample obtained by the scraping is put in a vessel such as an eggplant flask and 100 ml of tetrahydrofuran is added into this vessel. Examples of tetrahydrofuran include commercially available tetrahydrofuran to which a stabilizer is added and commercially available tetrahydrofuran to which a stabilizer is not added. Meanwhile, here, the commercially available tetrahydrofuran to which a stabilizer is not added is used. The same applies to tetrahydrofuran used in washing described hereinafter.

3. A reflux tube is attached to the vessel and heated in a water bath at a water temperature of 60° C. for 90 minutes. After filtering the content in the heated vessel with a filter paper, the solid content remaining on the filter paper is washed with tetrahydrofuran several times, and the washed solid content is moved to a vessel such as a beaker. A 4 N (4 mol/L) hydrochloric acid aqueous solution is added into this vessel and a residue remaining without being dissolved is extracted by filtering. As a filter, a filter having a hole diameter smaller than 0.05 μm is used. For example, a membrane filter used for chromatography analysis (for example, MF MILLIPORE manufactured by Merck Millipore Corporation) can be used. The residue extracted by the filtering is washed with pure water several times and dried.

Ferromagnetic powder and organic matters (binding agent and the like) are dissolved by the operation described above, and a non-magnetic filler is collected as a residue.

By performing the steps described above, the non-magnetic filler can be extracted from the magnetic layer. In a case where a plurality of kinds of non-magnetic fillers are included in the non-magnetic filler extracted as described above, the plurality of kinds of non-magnetic fillers can be divided depending on the differences of density.

As preferred colloidal particles, inorganic oxide colloidal particles can be used. As the inorganic oxide colloidal particles, colloidal particles of inorganic oxide described above can be used, and composite inorganic oxide colloidal particles such as $SiO_2.Al_2O_3$, $SiO_2.B_2O_3$, $TiO_2.CeO_2$, $SnO_2.Sb_2O_3$, $SiO_2.Al_2O_3.TiO_2$, and $TiO_2.CeO_2.SiO_2$ can be used. The inorganic oxide colloidal particles such as $SiO_2$, $Al_2O_3$, $TiO_2$, $ZrO_2$, and $Fe_2O_3$ are preferable and silica colloidal particles (colloidal silica) are particularly preferable. Meanwhile, typical colloidal particles have a hydrophilic surface, and thus, the colloidal particles are suitable for manufacturing a colloidal solution using water as a dispersion medium. For example, colloidal silica obtained by a general synthesis method has a surface covered with polarized oxygen atoms ($O^{2-}$), and thus, colloidal silica adsorbs water in water, forms a hydroxyl group, and is stabilized. However, these particles are hardly present in a colloidal state, in an organic solvent normally used in the magnetic layer forming composition. With respect to this, the colloidal particles of the invention and the specification are particles which are not precipitated but are dispersed to cause a colloidal dispersion, when 1 g thereof is added with respect to 100 mL of the organic solvent described above. Such colloidal particles can be prepared by a well-known method of hydrophobing the surface by surface treatment. For details of such hydrophobization treatment, descriptions disclosed in JP1993-269365A (JP-H05-269365A), JP1993-287213A (JP-H05-287213A), and JP2007-63117A are referred to.

As a manufacturing method of the silica colloidal particles (colloidal silica) which are preferred colloidal particles, two kinds of methods such as a water glass method and a sol-gel method are generally known. The water glass method is a method of using silica soda (sodium silicate, so-called water glass) as a raw material, performing ion exchange with respect to this to generate an active silica, and causing particle growth. Meanwhile, the sol-gel method is a method of using tetraalkoxysilane as a raw material, and performing hydrolysis under a basic catalyst and causing particle growth at the same time. In a case of using the silica colloidal particles, the silica colloidal particles may be manufactured by any manufacturing method described above.

An average particle size of the projection formation agent is preferably 50 to 200 nm, and more preferably 50 to 150 nm.

The content of the projection formation agent in the magnetic layer is preferably 1.0 to 4.0 parts by mass and more preferably 1.5 to 3.5 parts by mass with respect to 100.0 parts by mass of the ferromagnetic powder.

Non-Magnetic Layer

Next, the non-magnetic layer will be described. The magnetic tape includes a non-magnetic layer including non-magnetic powder and a binding agent between the non-magnetic support and the magnetic layer. The non-magnetic powder used in the non-magnetic layer may be inorganic powder or organic powder. In addition, carbon black and the like can also be used. Examples of the inorganic powder include powders of metal, metal oxide, metal carbonate, metal sulfate, metal nitride, metal carbide, and metal sulfide. These non-magnetic powders can be purchased as a commercially available product or can be manufactured by a well-known method. For details thereof, descriptions disclosed in paragraphs 0146 to 0150 of JP2011-216149A can be referred to. For carbon black which can be used in the non-magnetic layer, descriptions disclosed in paragraphs 0040 and 0041 of JP2010-24113A can be referred to. The content (filling percentage) of the non-magnetic powder of the non-magnetic layer is preferably 50 to 90 mass % and more preferably 60 to 90 mass %.

In regards to other details of a binding agent or additives of the non-magnetic layer, the well-known technology regarding the non-magnetic layer can be applied. In addition, in regards to the type and the content of the binding agent, and the type and the content of the additive, for example, the well-known technology regarding the magnetic layer can be applied.

The non-magnetic layer of the invention and the specification also includes a substantially non-magnetic layer including a small amount of ferromagnetic powder as impurities or intentionally, together with the non-magnetic powder. Here, the substantially non-magnetic layer is a layer having a residual magnetic flux density equal to or smaller than 10 mT, a layer having coercivity equal to or smaller than 7.96 kA/m (100 Oe), or a layer having a residual magnetic flux density equal to or smaller than 10 mT and coercivity equal to or smaller than 7.96 kA/m (100 Oe). It is preferable that the non-magnetic layer does not have a residual magnetic flux density and coercivity.

Back Coating Layer

The magnetic tape can also include a back coating layer including non-magnetic powder and a binding agent on a side of the non-magnetic support opposite to the side including the magnetic layer. The back coating layer preferably includes any one or both of carbon black and inorganic powder. In regards to the binding agent included in the back coating layer and various additives which can be arbitrarily included in the back coating layer, a well-known technology regarding the treatment of the magnetic layer and/or the non-magnetic layer can be applied.

Non-Magnetic Support

Next, the non-magnetic support (hereinafter, also simply referred to as a "support") will be described. As the non-magnetic support, well-known components such as polyethylene terephthalate, polyethylene naphthalate, polyamide, polyamide imide, aromatic polyamide subjected to biaxial stretching are used. Among these, polyethylene terephthalate, polyethylene naphthalate, and polyamide are preferable. Corona discharge, plasma treatment, easy-bonding treatment, or thermal treatment may be performed with respect to these supports in advance.

Various Thickness

The total thickness of the magnetic layer and the non-magnetic layer of the magnetic tape is as described above.

A thickness of the non-magnetic support of the magnetic tape is preferably 3.00 to 6.00 μm and more preferably 3.00 to 4.50 μm.

A thickness of the magnetic layer can be optimized in accordance with saturation magnetization quantity of the magnetic head used, a head gap length, or a band of a recording signal. The thickness of the magnetic layer is normally 0.01 μm to 0.15 μm, and is preferably 0.02 μm to 0.12 μm and more preferably 0.03 μm to 0.10 μm, from a viewpoint of realizing recording at high density. The magnetic layer may be at least single layer, the magnetic layer may be separated into two or more layers having different magnetic properties, and a configuration of a well-known multilayered magnetic layer can be applied. A thickness of the magnetic layer in a case where the magnetic layer is separated into two or more layers is the total thickness of the layers.

A thickness of the non-magnetic layer is, for example, 0.10 to 0.55 μm and is preferably 0.10 to 0.50 μm.

A thickness of the back coating layer is preferably equal to or smaller than 0.90 μm and even more preferably 0.10 to 0.70 μm.

In addition, the total thickness of the magnetic tape is preferably equal to or smaller than 6.00 μm, more preferably equal to or smaller than 5.70 μm, and even more preferably equal to or smaller than 5.50 μm, from a viewpoint of improving recording capacity for 1 reel of the magnetic tape cartridge. Meanwhile, the total thickness of the magnetic tape is preferably equal to or greater than 1.00 μm, from a viewpoint of availability (handling properties) of the magnetic tape.

Manufacturing Method of Magnetic Tape

Preparation of Each Layer Forming Composition

Each composition for forming the magnetic layer, the non-magnetic layer, or the back coating layer normally includes a solvent, together with various components described above. As the solvent, various organic solvents generally used for manufacturing a coating type magnetic tape can be used. Among those, from a viewpoint of solubility of the binding agent normally used in the coating type magnetic recording medium, each layer forming composition preferably includes one or more ketone solvents such as acetone, methyl ethyl ketone, methyl isobutyl ketone, diisobutyl ketone, cyclohexanone, isophorone, and tetrahydrofuran. The amount of the solvent of each layer forming composition is not particularly limited, and can be set to be the same as that of each layer forming composition of a typical coating type magnetic recording medium. The steps of preparing a composition for forming each layer generally include at least a kneading step, a dispersing step, and a mixing step provided before and after these steps, if necessary. Each step may be divided into two or more stages. All of raw materials used in the invention may be added at an initial stage or in a middle stage of each step. In addition, each raw material may be separately added in two or more steps. In the preparation of the magnetic layer forming composition, it is preferable that the abrasive and the ferromagnetic powder are separately dispersed as described above. For the preparation method of the abrasive liquid and the magnetic solution used in the separate dispersing and the preparation method of the magnetic layer forming composition, descriptions disclosed in paragraph 0042 to 0048 of JP2014-179149A can be referred to. In addition, in order to manufacture the magnetic tape, a well-known manufacturing technology can be used. In the kneading step, an open kneader, a continuous kneader, a pressure kneader, or a kneader having a strong kneading force such as an extruder is preferably used. The details of the kneading processes of these kneaders are disclosed in JP1989-106338A (JP-H01-106338A) and JP1989-79274A (JP-H01-79274A). In addition, in order to disperse each layer forming composition, glass beads and one or more kinds of other dispersion beads can be used as a dispersion medium. As such dispersion beads, zirconia beads, titania beads, and steel beads which are dispersion beads having high specific gravity are suitable. These dispersion beads can be used by optimizing a particle diameter (bead diameter) and a filling percentage of the dispersion beads. As a dispersion device, a well-known dispersion device can be used. The each layer forming composition may be filtered by a well-known method before performing the coating step. The filtering can be performed by using a filter, for example. As the filter used in the filtering, a filter having a hole diameter of 0.01 to 3 μm can be used, for example.

In addition, the $FWHM_{after}$ measured after the vacuum heating tends to be decreased, in a case where the dispersion conditions of the magnetic layer forming composition are reinforced (for example, the number of times of the dispersion is increased, the dispersion time is extended, and the like), and/or the filtering conditions are reinforced (for example, a filter having a small hole diameter is used as a filter used in the filtering, the number of times of the filtering is increased, and the like). The inventors have surmised that this is because the uniformity of the height of the projection present on the surface of the magnetic layer is improved, by improving dispersibility and/or the uniformity of the particle size of the powder included in the magnetic layer forming composition, particularly, the non-magnetic filler which may function as the projection formation agent described above. In one aspect, a preliminary experiment can be performed before the actual manufacturing, and the dispersion conditions and/or the filtering conditions can be optimized.

In addition, in the magnetic tape including the magnetic layer including carbon black as the non-magnetic filler, it is effective to use the dispersing agent for improving dispersibility of the carbon black as a magnetic layer component, in order to decrease the $FWHM_{after}$ measured after the vacuum heating. For example, organic tertiary amine can be used as a dispersing agent of carbon black. For details of the organic tertiary amine, descriptions disclosed in paragraphs 0011 to 0018 and 0021 of JP2013-049832A can be referred to. The organic tertiary amine is more preferably trialkylamine. An alkyl group included in trialkylamine is preferably an alkyl group having 1 to 18 carbon atoms. Three alkyl groups included in trialkylamine may be the same as each other or different from each other. For details of the alkyl group, descriptions disclosed in paragraphs 0015 and 0016 of JP2013-049832A can be referred to. As trialkylamine, trioctylamine is particularly preferable.

Coating Step

The magnetic layer can be formed by performing multi-layer coating of the magnetic layer forming composition with the non-magnetic layer forming composition in order or at the same time. The back coating layer can be formed by applying the back coating layer forming composition to a side of the non-magnetic support opposite to a side provided with the magnetic layer (or to be provided with the magnetic layer). For details of the coating for forming each layer, a description disclosed in a paragraph 0066 of JP2010-231843A can be referred to.

Other Steps

For details of various other steps for manufacturing the magnetic tape, descriptions disclosed in paragraphs 0067 to 0070 of JP2010-231843A can be referred to.

One Aspect of Preferred Manufacturing Method

As a preferred manufacturing method, a manufacturing method of applying vibration to the magnetic layer can be used, in order to improve uniformity of the thickness of the liquid film formed of fatty acid ester on the surface of the magnetic layer. The inventors have surmised that, by adding vibration, the liquid film formed of fatty acid ester on the surface of the magnetic layer flows and the uniformity of the thickness of the liquid film is improved.

That is, the magnetic tape can be manufactured by a manufacturing method including: forming the magnetic layer by applying the magnetic layer forming composition including ferromagnetic powder, a binding agent, an abrasive, and fatty acid ester, with the non-magnetic layer forming composition in order or at the same time, and drying; and applying vibration to the formed magnetic layer. The manufacturing method is identical to the typical manufacturing method of the magnetic tape, except for applying vibration to the magnetic layer, and the details thereof are as described above.

Means for applying vibration are not particularly limited. For example, the vibration can be applied to the magnetic layer, by bringing the surface of the non-magnetic support, provided with the magnetic layer formed, on a side opposite to the magnetic layer to come into contact with a vibration imparting unit. The non-magnetic support, provided with the magnetic layer formed, may run while coming into contact with a vibration imparting unit. The vibration imparting unit, for example, includes an ultrasonic vibrator therein, and accordingly, vibration can be applied to a product coming into contact with the unit. It is possible to adjust the vibration applied to the magnetic layer by a vibration frequency, and strength of the ultrasonic vibrator, and/or the contact time with the vibration imparting unit. For example, the contact time can be adjusted by a running speed of the non-magnetic support, provided with the magnetic layer formed, while coming into contact with the vibration imparting unit. The vibration imparting conditions are not particularly limited, and may be set so as to control the full width at half maximum of the spacing distribution, particularly, the $FWHM_{before}$. In order to set the vibration imparting conditions, a preliminary experiment can be performed before the actual manufacturing, and the conditions can be optimized.

As described above, it is possible to obtain a magnetic tape according to one aspect of the invention. However, the manufacturing method described above is merely an example, the state of the abrasive present in the magnetic layer, the $FWHM_{before}$, the $FWHM_{after}$, and the difference ($S_{after}-S_{before}$) can be controlled to be in respective ranges described above by an arbitrary method capable of adjusting the state of the abrasive present in the magnetic layer, the $FWHM_{before}$, the $FWHM_{after}$, and the difference ($S_{after}-S_{before}$), and such an aspect is also included in the invention.

The magnetic tape according to one aspect of the invention described above is generally accommodated in a magnetic tape cartridge and the magnetic tape cartridge is mounted in a drive. The configuration of the magnetic tape cartridge and the drive is well known. The magnetic tape runs (is transported) in the drive, the magnetic head for recording and/or reproducing of information comes into contact with and slides on the surface of the magnetic layer, and the recording of the information on the magnetic tape and/or reproducing of the recorded information are performed. In the magnetic tape, although the total thickness of the non-magnetic layer and the magnetic layer is equal to or smaller than 0.60 μm, it is possible to prevent a deterioration of electromagnetic conversion characteristics while repeating the running in a low temperature and high humidity environment.

EXAMPLES

Hereinafter, the invention will be described with reference to examples. However, the invention is not limited to aspects shown in the examples. "Parts" and "%" in the following description mean "parts by mass" and "mass %", unless otherwise noted. In addition, steps and evaluations described below are performed in an environment of an atmosphere temperature of 23° C.±1° C., unless otherwise noted.

Preparation Examples of Ferromagnetic Hexagonal Ferrite Powders

In the method disclosed in Example 1 of JP2011-225417A, an Al adhesion amount was adjusted by changing the amount of $Al_2O_3$ added to a raw material mixture, a particle size was adjusted by changing a crystallization temperature, and ferromagnetic hexagonal ferrite powders (barium ferrite powders) in which $Al_2O_3$ was adhered to the surface of the particle were manufactured.

Regarding the prepared ferromagnetic hexagonal ferrite powders, in a case where an average particle size (average plate diameter) was acquired by the method described above, it was 25 nm.

In addition, regarding the prepared ferromagnetic hexagonal ferrite powders, the Al content was measured and the Al presence state was confirmed by the method disclosed in a paragraph 0070 of JP2014-179149A. The Al content of the prepared ferromagnetic hexagonal ferrite powders was 3.0 mass % in terms of $Al_2O_3$ with respect to 100.0 mass % which is the total mass of the ferromagnetic hexagonal ferrite powder used in the measurement. In addition, in the prepared ferromagnetic hexagonal ferrite powders, it was confirmed that Al is adhered onto the primary particles (specifically, a coated film including Al is present).

Example 1

1. Preparation of Alumina Dispersion (Abrasive Liquid)

2,3-dihydroxynaphthalene (manufactured by Tokyo Chemical Industry Co., Ltd.) having the amount shown in Table 1, 31.3 parts of 32% solution (solvent is a mixed solvent of methyl ethyl ketone and toluene) of a polyester polyurethane resin having a $SO_3Na$ group as a polar group (UR-4800 manufactured by Toyobo Co., Ltd. (amount of a polar group: 80 meq/kg)), and 570.0 parts of a mixed solution of methyl ethyl ketone and cyclohexanone at 1:1 (mass ratio) as a solvent were mixed with 100.0 parts of alumina powder (Mohs hardness of 9) having a gelatinization ratio of approximately 65% and a BET specific surface area shown in Table 1, and dispersed in the presence of zirconia beads by a paint shaker for the time (bead dispersion time) shown in Table 1. After the dispersion, the dispersion liquid and the beads were separated by a mesh and an alumina dispersion (abrasive liquid) was obtained.

2. Magnetic Layer Forming Composition List

Magnetic Solution

Ferromagnetic hexagonal barium ferrite powder prepared in the preparation example: 100.0 parts $SO_3Na$ group-containing polyurethane resin: 14.0 parts
(Weight-average molecular weight: 70,000, $SO_3Na$ group: 0.2 meq/g)
Cyclohexanone: 150.0 parts
Methyl ethyl ketone: 150.0 parts
Abrasive Liquid
Alumina dispersion prepared in the section 1: 6.0 parts
Silica Sol (Projection Forming Agent Liquid)
Colloidal silica (average particle size of 100 nm): 2.0 parts Methyl ethyl ketone: 1.4 parts
Other Components
Stearic acid: 2.0 parts
Butyl stearate: see Table 1
Polyisocyanate (CORONATE (registered trademark) manufactured by Nippon Polyurethane Industry Co., Ltd.): 2.5 parts
Finishing Additive Solvent
Cyclohexanone: 200.0 parts
Methyl ethyl ketone: 200.0 parts 3. Non-Magnetic Layer Forming Composition List Non-magnetic inorganic powder: α-iron oxide: 100.0 parts
Average particle size (average long axis length): 0.15 μm
Average acicular ratio: 7
BET specific surface area: 52 m²/g
Carbon black: 20.0 parts
Average particle size: 20 nm
An electron beam-curable vinyl chloride copolymer: 13.0 parts
An electron beam-curable polyurethane resin: 6.0 parts
Stearic acid: 1.0 part
Butyl stearate: see Table 1
Cyclohexanone: 300.0 parts
Methyl ethyl ketone: 300.0 parts 4. Back Coating Layer Forming Composition List Non-magnetic inorganic powder: α-iron oxide: 80.0 parts
Average particle size (average long axis length): 0.15 μm
Average acicular ratio: 7
BET specific surface area: 52 m²/g
Carbon black: 20.0 parts
Average particle size: 20 nm
A vinyl chloride copolymer: 13.0 parts
Sulfonic acid group-containing polyurethane resin: 6.0 parts
Phenylphosphonic acid: 3.0 parts
Methyl ethyl ketone: 155.0 parts
Stearic acid: 3.0 parts
Butyl stearate: 3.0 parts
Polyisocyanate: 5.0 parts
Cyclohexanone: 355.0 parts 5. Preparation of Each Layer Forming Composition (1) Preparation of Magnetic Layer Forming Composition The magnetic layer forming composition was prepared by the following method.

A magnetic solution was prepared by performing beads dispersing of the magnetic solution components described above by using beads as the dispersion medium in a batch type vertical sand mill. Specifically, the beads dispersion was performed for the dispersion retention time shown in Table 1 by using zirconia beads (bead diameter: 0.1 mm).

The magnetic solution obtained as described above, the abrasive liquid, silica sol, other components, and the finishing additive solvent were introduced into a dissolver stirrer, and were stirred at a circumferential speed of 10 m/sec for 30 minutes. After that, the treatment was performed with a flow type ultrasonic dispersing device at a flow rate of 7.5 kg/min for the number of times of the passes shown in Table 1, and then, a magnetic layer forming composition was prepared by performing filtering with a filter having a hole diameter shown in Table 1, for the number of times of the passes shown in Table 1.

(2) Preparation of Non-Magnetic Layer Forming Composition

The non-magnetic layer forming composition was prepared by the following method.

Each component excluding stearic acid, butyl stearate, cyclohexanone, and methyl ethyl ketone was beads-dispersed by using a batch type vertical sand mill (dispersion medium: zirconia beads (bead diameter: 0.1 mm), dispersion retention time: 24 hours) to obtain dispersion liquid. After that, the remaining components were added into the obtained dispersion liquid and stirred with a dissolver. Then, the obtained dispersion liquid was filtered by using the filter (hole diameter of 0.5 µm), and a non-magnetic layer forming composition was prepared.

(3) Preparation of Back Coating Layer Forming Composition

The back coating layer forming composition was prepared by the following method.

Each component excluding stearic acid, butyl stearate, polyisocyanate, and cyclohexanone was kneaded and diluted by an open kneader. Then, the obtained mixed solution was subjected to a dispersing process of 12 passes, with a transverse beads mill by using zirconia beads having a bead diameter of 1.0 mm, by setting a bead filling percentage as 80 volume %, a circumferential speed of rotor distal end as 10 m/sec, and a retention time for 1 pass as 2 minutes. After that, the remaining components were added into the obtained dispersion liquid and stirred with a dissolver. Then, the obtained dispersion liquid was filtered with a filter (hole diameter: 1.0 µm) and a back coating layer forming composition was prepared.

6. Manufacturing of Magnetic Tape

The non-magnetic layer forming composition was applied onto a polyethylene naphthalate support having a thickness shown in Table 1 and dried so that the thickness after the drying becomes a thickness shown in Table 1, and then, an electron beam was emitted with an energy of 40 kGy at an acceleration voltage of 125 kV. The magnetic layer forming composition was applied so that the thickness after the drying becomes a thickness shown in Table 1 and dried to form a coating layer of the magnetic layer forming composition.

After that, the support, provided with the coating layer formed, was installed in a vibration imparting device shown in FIG. 1 so that the surface thereof on a side opposite to the surface where the coating layer is formed comes into contact with the vibration imparting unit, and the support (in FIG. 1, reference numeral 1), provided with the coating layer formed, was transported at a transportation speed of 0.5 m/sec, to apply vibration to the coating layer. In FIG. 1, a reference numeral 2 denotes a guide roller (a reference numeral 2 denotes one of two guide rollers), a reference numeral 3 denotes the vibration imparting device (vibration imparting unit including the ultrasonic vibrator), and an arrow denotes a transportation direction. The time from the start of the contact of the arbitrary portion of the support, provided with the coating layer formed, with the vibration imparting unit until the end of the contact is shown in Table 1 as the vibration imparting time. The vibration imparting unit used includes an ultrasonic vibrator therein. The vibration was imparted by setting a vibration frequency and the intensity of the ultrasonic vibrator as values shown in Table 1.

After that, the back coating layer forming composition was applied onto the surface of the support on a side opposite to the surface where the non-magnetic layer and the magnetic layer are formed, and dried so that the thickness after the drying becomes thickness shown in Table 1.

After that, the surface smoothing treatment (calender process) was performed with a calender roll configured of only a metal roll, at a calender process speed of 80 m/min, linear pressure of 300 kg/cm (294 kN/m), and a surface temperature of a calender roll of 95° C.

Then, the thermal treatment was performed in the environment of the atmosphere temperature of 70° C. for 36 hours. After the thermal treatment, the slitting was performed so as to have a width of ½ inches (0.0127 meters), and the surface of the magnetic layer was cleaned with a tape cleaning device in which a nonwoven fabric and a razor blade are attached to a device including a sending and winding device of the slit so as to press the surface of the magnetic layer.

By doing so, a magnetic tape was manufactured.

Examples 2 to 8 and Comparative Examples 1 to 12

Each magnetic tape of Examples 2 to 8 and Comparative Examples 1 to 12 was obtained in the same manner as in Example 1, except that the manufacturing conditions were changed as shown in Table 1. The vibration imparting time was adjusted by changing the transportation speed of the support on which the coating layer of the magnetic layer forming composition was formed.

A part of each magnetic tape of Examples 1 to 8 and Comparative Examples 1 to 12 obtained by the steps described above was used in the evaluation of physical properties described below, and the other part was used in the evaluation of performance which will be described later. The thickness of each layer of each magnetic tape and the non-magnetic support of Examples 1 to 8 and Comparative Examples 1 to 12 was acquired by the following method. It was confirmed that the thicknesses of the formed layer and the non-magnetic support was the thicknesses shown in Table 1.

A cross section of the magnetic tape in a thickness direction was exposed to ion beams and the exposed cross section was observed with a scanning electron microscope. Various thicknesses were obtained as an arithmetical mean of thicknesses obtained at two portions in the thickness direction in the cross section observation.

7. Evaluation of Physical Properties (1) State of Abrasive Present in Magnetic Layer (Plan View Maximum Area Percentage of Abrasive)

By the method described above, the plan view maximum area percentage of the abrasive confirmed in a region having a size of 4.3 µm×6.3 µm of the surface of the magnetic layer is acquired.

(2) $FWHM_{before}$ and $FWHM_{after}$

The full width at half maximum of the spacing distributions $FWHM_{before}$ and $FWHM_{after}$ before and after vacuum heating were acquired by the following method by using a tape spacing analyzer (TSA) (manufactured by Micro Physics, Inc.).

In a state where a glass plate included in the TSA was disposed on the surface of the magnetic layer of the magnetic tape, a hemisphere was pressed against the surface of the back coating layer of the magnetic tape at a pressure of $5.05×10^4$ N/m (0.5 atm) by using a hemisphere made of urethane included in the TSA as a pressing member. In this state, a given region (150,000 to 200,000 µm$^2$) of the surface of the magnetic layer of the magnetic tape was irradiated with white light from a stroboscope included in the TSA through the glass plate, and the obtained reflected light was received by a charge-coupled device (CCD) through an interference filter (filter selectively passing light at a wavelength of 633 nm), and thus, an interference fringe image generated on the uneven part of the region was obtained.

This image was divided into 300,000 points, a distance (spacing) between the surface of the glass plate on the magnetic tape side and the surface of the magnetic layer of the magnetic tape was acquired, and the full width at half maximum of spacing distribution was full width at half maximum, in a case where this spacing was shown with a histogram, and this histogram was fit with Gaussian distribution.

The vacuum heating was performed by storing the magnetic tape in a vacuum constant temperature drying machine with a degree of vacuum of 200 Pa to 0.01 Mpa and at inner atmosphere temperature of 70° C. to 90° C. for 24 hours.

(3) Difference ($S_{after}-S_{before}$)

The difference ($S_{after}-S_{before}$) was a value obtained by subtracting a mode of the histogram before the vacuum heating from a mode of the histogram after the vacuum heating obtained in the section (2).

8. Evaluation of Performance (Change (Decrease of SNR) in Electromagnetic Conversion Characteristics (Signal-To-Noise-Ratio (SNR)) After Repeated Running in Low Temperature and High Humidity Environment)

The electromagnetic conversion characteristics (SNR) were measured by the following method by using a reel tester having a width of ½ inches (0.0127 meters) and including a fixed head.

A head/tape relative speed was set as 5.5 m/sec, a metal-in-gap (MIG) head (gap length of 0.15 μm, track width of 1.0 μm) was used in the recording, and a recording current was set as an optimal recording current of each magnetic tape. As a reproducing head, a giant-magnetoresistive (GMR) head having an element thickness of 15 nm, a shield interval 0.1 μm and a lead width of 0.5 μm was used. The recording of a signal was performed at linear recording density of 270 KFci, and measurement regarding a reproduction signal was performed with a spectrum analyzer manufactured by Shibasoku Co., Ltd. The unit, kfci, is a unit of linear recording density (not able to convert to the SI unit system). Regarding the signal, a signal which was sufficiently stabilized after starting the running of the magnetic tape was used. A ratio of an output value of a carrier signal and integrated noise of the entire spectral range was set as a SNR.

Under the conditions described above, a tape length for 1 pass was set as 1,000 m, the reciprocating running for 5,000 passes was allowed in an environment of an atmosphere temperature of 13° C. and relative humidity of 80% to perform reproduction (head/tape relative speed: 6.0 m/sec), and the SNR was measured. A difference between the SNR of the first pass and the SNR of the 5,000-th pass (SNR of the 5,000-th pass–SNR of the first pass) was acquired. In a case where the difference is less than −2.0 dB, the magnetic tape can be determined as a magnetic tape which shows excellent electromagnetic conversion characteristics desired in a data back-up tape.

The results of the evaluations described above are shown in Table 1.

TABLE 1

| | Content of butyl stearate (part) | | Ultrasonic vibration imparting conditions | | | Magnetic layer forming composition preparation conditions | | |
|---|---|---|---|---|---|---|---|---|
| | Magnetic layer forming composition | Non-magnetic layer forming composition | Vibration imparting time (sec) | Vibration frequency (kHz) | Intensity (W) | Number of times of passes of flow type ultrasonic dispersing device (times) | Number of times of filtering (times) | Filter hole diameter (μm) |
| Comparative Example 1 | 1.0 | 4.0 | None | None | None | 2 | 1 | 1.0 |
| Comparative Example 2 | 1.0 | 4.0 | None | None | None | 2 | 1 | 1.0 |
| Comparative Example 3 | 1.0 | 4.0 | None | None | None | 2 | 1 | 1.0 |
| Comparative Example 4 | 1.0 | 4.0 | None | None | None | 2 | 1 | 1.0 |
| Comparative Example 5 | 1.0 | 4.0 | None | None | None | 2 | 1 | 1.0 |
| Comparative Example 6 | 1.0 | 4.0 | None | None | None | 2 | 1 | 1.0 |
| Comparative Example 7 | 1.0 | 4.0 | None | None | None | 2 | 1 | 1.0 |
| Comparative Example 8 | 1.0 | 4.0 | 0.5 | 30 | 100 | 1 | 1 | 1.0 |
| Comparative Example 9 | 1.0 | 10.0 | 0.5 | 30 | 100 | 2 | 1 | 1.0 |
| Comparative Example 10 | 0 | 0 | 0.5 | 30 | 100 | 2 | 1 | 1.0 |
| Comparative Example 11 | 1.0 | 4.0 | 0.5 | 30 | 100 | 2 | 1 | 1.0 |
| Comparative Example 12 | 1.0 | 4.0 | 0.5 | 30 | 100 | 2 | 1 | 1.0 |
| Example 1 | 1.0 | 4.0 | 0.5 | 30 | 100 | 2 | 1 | 1.0 |
| Example 2 | 1.0 | 4.0 | 3.0 | 30 | 100 | 2 | 1 | 1.0 |
| Example 3 | 1.0 | 4.0 | 0.5 | 30 | 100 | 30 | 5 | 0.5 |
| Example 4 | 1.0 | 4.0 | 0.5 | 30 | 100 | 2 | 1 | 1.0 |
| Example 5 | 1.0 | 4.0 | 0.5 | 30 | 100 | 2 | 1 | 1.0 |
| Example 6 | 1.0 | 4.0 | 0.5 | 30 | 100 | 2 | 1 | 1.0 |
| Example 7 | 1.0 | 4.0 | 0.5 | 30 | 100 | 2 | 1 | 1.0 |
| Example 8 | 1.0 | 4.0 | 3.0 | 30 | 100 | 30 | 5 | 0.5 |

TABLE 1-continued

|  | Abrasive liquid | | | Treatment conditions after mixing of magnetic solution abrasive liquid, silica sol, other components and finishing additive solvent | | |
|---|---|---|---|---|---|---|
|  | Abrasive | | Abrasive liquid | | | |
|  | BET specific surface area ($m^2/g$) | Beads dispersion time (hour) | dispersing agent (2,3-Dihydroxynaphthalene) content (part) | Beads dispersion time (min) | Ultrasonic dispersion time (min) | Filter hole diameter |
| Comparative Example 1 | 20 | 5 | 0 | 5 | 0.5 | 0.5 μm |
| Comparative Example 2 | 20 | 5 | 0 | 5 | 0.5 | 0.5 μm |
| Comparative Example 3 | 20 | 5 | 0 | 5 | 0.5 | 0.5 μm |
| Comparative Example 4 | 20 | 5 | 0 | 5 | 0.5 | 0.5 μm |
| Comparative Example 5 | 20 | 5 | 1.0 | 60 | 30 | 0.5 μm |
| Comparative Example 6 | 20 | 30 | 3.0 | 60 | 30 | 0.5 μm |
| Comparative Example 7 | 30 | 30 | 3.0 | 180 | 60 | 0.3 μm |
| Comparative Example 8 | 20 | 30 | 3.0 | 60 | 30 | 0.5 μm |
| Comparative Example 9 | 20 | 30 | 3.0 | 60 | 30 | 0.5 μm |
| Comparative Example 10 | 20 | 30 | 3.0 | 60 | 30 | 0.5 μm |
| Comparative Example 11 | 20 | 5 | 0 | 5 | 0.5 | 0.5 μm |
| Comparative Example 12 | 30 | 30 | 5.0 | 360 | 60 | 0.3 μm |
| Example 1 | 20 | 5 | 1.0 | 60 | 30 | 0.5 μm |
| Example 2 | 20 | 5 | 1.0 | 60 | 30 | 0.5 μm |
| Example 3 | 20 | 5 | 1.0 | 60 | 30 | 0.5 μm |
| Example 4 | 20 | 30 | 3.0 | 60 | 30 | 0.5 μm |
| Example 5 | 30 | 30 | 3.0 | 180 | 60 | 0.3 μm |
| Example 6 | 20 | 30 | 3.0 | 60 | 30 | 0.5 μm |
| Example 7 | 20 | 30 | 3.0 | 60 | 30 | 0.5 μm |
| Example 8 | 30 | 30 | 3.0 | 180 | 60 | 0.3 μm |

|  | Magnetic layer Thickness (μm) | Non-magnetic layer Thickness (μm) | Non-magnetic support Thickness (μm) | Back coating layer Thickness (μm) | Non-magnetic layer + magnetic layer Total thickness (μm) |
|---|---|---|---|---|---|
| Comparative Example 1 | 0.10 | 1.00 | 4.30 | 0.60 | 1.10 |
| Comparative Example 2 | 0.10 | 0.70 | 4.30 | 0.60 | 0.80 |
| Comparative Example 3 | 0.10 | 0.50 | 4.30 | 0.60 | 0.60 |
| Comparative Example 4 | 0.10 | 0.10 | 4.30 | 0.60 | 0.20 |
| Comparative Example 5 | 0.10 | 0.50 | 4.30 | 0.60 | 0.60 |
| Comparative Example 6 | 0.10 | 0.50 | 4.30 | 0.60 | 0.60 |
| Comparative Example 7 | 0.10 | 0.50 | 4.30 | 0.60 | 0.60 |
| Comparative Example 8 | 0.10 | 0.50 | 4.30 | 0.60 | 0.60 |
| Comparative Example 9 | 0.10 | 0.50 | 4.30 | 0.60 | 0.60 |
| Comparative Example 10 | 0.10 | 0.50 | 4.30 | 0.60 | 0.60 |
| Comparative Example 11 | 0.10 | 0.50 | 4.30 | 0.60 | 0.60 |
| Comparative Example 12 | 0.10 | 0.50 | 4.30 | 0.60 | 0.60 |
| Example 1 | 0.10 | 0.50 | 4.30 | 0.60 | 0.60 |
| Example 2 | 0.10 | 0.50 | 4.30 | 0.60 | 0.60 |
| Example 3 | 0.10 | 0.50 | 4.30 | 0.60 | 0.60 |
| Example 4 | 0.10 | 0.50 | 4.30 | 0.60 | 0.60 |
| Example 5 | 0.10 | 0.50 | 4.30 | 0.60 | 0.60 |
| Example 6 | 0.10 | 0.10 | 4.30 | 0.60 | 0.20 |
| Example 7 | 0.10 | 0.50 | 4.30 | 0.60 | 0.60 |
| Example 8 | 0.10 | 0.50 | 4.30 | 0.60 | 0.60 |

|  | Evaluation result | | | | |
|---|---|---|---|---|---|
|  | $S_{after} - S_{before}$ (nm) | $FWHM_{before}$ (nm) | $FWHM_{after}$ (nm) | Percentage of plan view maximum area of abrasive | Decrease in SNR (dB) |
| Comparative Example 1 | 6.0 | 8.6 | 6.8 | 0.06% | −0.3 |
| Comparative Example 2 | 4.2 | 8.6 | 6.8 | 0.06% | −0.5 |
| Comparative Example 3 | 3.2 | 8.6 | 6.8 | 0.06% | −3.3 |
| Comparative Example 4 | 1.0 | 8.6 | 6.8 | 0.06% | −5.6 |
| Comparative Example 5 | 3.2 | 8.6 | 6.8 | 0.05% | −3.2 |
| Comparative Example 6 | 3.2 | 8.6 | 6.8 | 0.04% | −4.5 |
| Comparative Example 7 | 3.2 | 8.6 | 6.8 | 0.02% | −5.9 |
| Comparative Example 8 | 3.2 | 6.8 | 7.5 | 0.04% | −3.1 |
| Comparative Example 9 | 8.4 | 6.8 | 6.8 | 0.04% | −5.0 |
| Comparative Example 10 | 0 | 6.8 | 6.8 | 0.04% | −3.0 |
| Comparative Example 11 | 3.2 | 6.8 | 6.8 | 0.06% | −4.2 |
| Comparative Example 12 | 3.2 | 6.8 | 6.8 | 0.01% | −2.5 |
| Example 1 | 3.2 | 6.8 | 6.8 | 0.05% | −0.7 |
| Example 2 | 3.2 | 4.0 | 6.8 | 0.05% | −0.5 |
| Example 3 | 3.2 | 6.8 | 4.0 | 0.05% | −0.2 |

TABLE 1-continued

| | | | | | |
|---|---|---|---|---|---|
| Example 4 | 3.2 | 6.8 | 6.8 | 0.04% | −0.8 |
| Example 5 | 3.2 | 6.8 | 6.8 | 0.02% | −0.6 |
| Example 6 | 3.2 | 6.8 | 6.8 | 0.04% | −0.4 |
| Example 7 | 3.2 | 6.8 | 6.8 | 0.04% | −0.5 |
| Example 8 | 3.2 | 4.0 | 4.0 | 0.02% | −0.3 |

With the comparison of Comparative Examples, it was confirmed that, in the case where the total thickness of the non-magnetic layer and the magnetic layer is equal to or smaller than 0.60 µm (Comparative Examples 3 to 12), the SNR is significantly decreased by the repeated running in a low temperature and high humidity environment, compared to the case where the total thickness of the non-magnetic layer and the magnetic layer exceeds 0.60 µm (Comparative Examples 1 and 2).

In a case where a reproducing head after evaluation of the magnetic tape of the comparative example was visually observed, in a reproducing head (GMR head) of Comparative Examples 3, 4, and 11 after the evaluation, it was confirmed that a phenomenon called pole tip recession (PTR) in which a difference in level of an element portion and a sliding surface of a GMR head occurs. It is assumed that the PTR is generated due to the chipping of the element part of the GMR head caused by the sliding on the surface of the magnetic layer. Meanwhile, in the reproducing head of Comparative Examples 5 to 8, 10, and 12 after the evaluation, it was confirmed that the head attached materials were attached to the GMR head. It is assumed that, in Comparative Examples 5 to 8 and 10, the scraps generated due to chipping of the surface of the magnetic layer become head attached materials. It is considered that, in Comparative Example 12, in a case where the abrasion properties of the surface of the magnetic layer are not sufficiently exhibited, the head attached materials are not removed.

In Comparative Example 9, it is thought that a reason of a significant decrease in SNR due to the repeated running in the low temperature and high humidity environment is the occurrence of sticking between the surface of the magnetic layer and the reproducing head.

With respect to this, in the magnetic tape of Examples 1 to 8, the total thickness of the non-magnetic layer and the magnetic layer was equal to or smaller than 0.60 µm, but a decrease in SNR was prevented, compared to the magnetic tape of Comparative Examples 3 to 12.

The invention is effective in technical fields of magnetic tapes for high-density recording.

What is claimed is:

1. A magnetic tape comprising:
    a non-magnetic support;
    a non-magnetic layer including non-magnetic powder and a binding agent on the non-magnetic support; and
    a magnetic layer including ferromagnetic powder and a binding agent on the non-magnetic layer,
    wherein a total thickness of the non-magnetic layer and the magnetic layer is equal to or smaller than 0.60 µm,
    the magnetic layer includes an abrasive and fatty acid ester,
    a percentage of a plan view maximum area of the abrasive confirmed in a region having a size of 4.3 µm×6.3 µm of a surface of the magnetic layer with respect to the total area of the region, obtained by plane observation performed by using a scanning electron microscope is equal to or greater than 0.02% and less than 0.06%,
    a full width at half maximum of spacing distribution measured by optical interferometry regarding the surface of the magnetic layer before performing a vacuum heating with respect to the magnetic tape is greater than 0 nm and equal to or smaller than 7.0 nm,
    a full width at half maximum of spacing distribution measured by optical interferometry regarding the surface of the magnetic layer after performing the vacuum heating with respect to the magnetic tape is greater than 0 nm and equal to or smaller than 7.0 nm, and
    a difference $S_{after}-S_{before}$ between a spacing $S_{after}$ measured by optical interferometry regarding the surface of the magnetic layer after performing the vacuum heating with respect to the magnetic tape and a spacing $S_{before}$ measured by optical interferometry regarding the surface of the magnetic layer before performing the vacuum heating with respect to the magnetic tape is greater than 0 nm and equal to or smaller than 8.0 nm.

2. The magnetic tape according to claim 1,
    wherein the percentage of a plan view maximum area of the abrasive confirmed in a region having a size of 4.3 µm×6.3 µm of the surface of the magnetic layer with respect to the total area of the region, obtained by plane observation performed by using a scanning electron microscope is 0.02% to 0.05%.

3. The magnetic tape according to claim 1,
    wherein the total thickness of the non-magnetic layer and the magnetic layer is 0.20 µm to 0.60 µm.

4. The magnetic tape according to claim 1,
    wherein the full width at half maximum of spacing distribution measured by optical interferometry regarding the surface of the magnetic layer before performing the vacuum heating with respect to the magnetic tape is 3.0 nm to 7.0 nm.

5. The magnetic tape according to claim 1,
    wherein the full width at half maximum of spacing distribution measured by optical interferometry regarding the surface of the magnetic layer after performing the vacuum heating with respect to the magnetic tape is 3.0 nm to 7.0 nm.

6. The magnetic tape according to claim 1,
    wherein the difference $S_{after}-S_{before}$ is 2.0 nm to 8.0 nm.

7. The magnetic tape according to claim 1,
    wherein a BET specific surface area of the abrasive is 14 to 40 m$^2$/g.

8. The magnetic tape according to claim 1,
    wherein the abrasive is alumina powder.

9. The magnetic tape according to claim 1,
    wherein the magnetic layer includes an aromatic hydrocarbon compound including a phenolic hydroxyl group.

10. The magnetic tape according to claim 1,
    wherein the ferromagnetic powder is ferromagnetic hexagonal ferrite powder.

11. The magnetic tape according to claim 10,
    wherein the ferromagnetic hexagonal ferrite powder includes Al.

* * * * *